(12) United States Patent
Takahashi

(10) Patent No.: US 6,729,448 B2
(45) Date of Patent: May 4, 2004

(54) ROTARY DAMPER

(75) Inventor: Kenji Takahashi, Tokyo (JP)

(73) Assignee: Tok Bearing Co., Ltd., Tokyo (JP)

( * ) Notice: Subject to any disclaimer, the term of this patent is extended or adjusted under 35 U.S.C. 154(b) by 0 days.

(21) Appl. No.: 09/852,886

(22) Filed: May 10, 2001

(65) Prior Publication Data

US 2002/0043127 A1 Apr. 18, 2002

(30) Foreign Application Priority Data

Oct. 18, 2000 (JP) ........................................ 2000-317458

(51) Int. Cl.$^7$ ............................................... F16D 57/02
(52) U.S. Cl. .................... 188/294; 188/322.5; 188/290; 482/63
(58) Field of Search ........................ 188/325, 78, 322.5, 188/290, 293, 294, 296; 482/5, 6, 7, 57, 58, 63, 92, 903; 4/236, 240, 246.2; 16/54, 82, 85

(56) References Cited

U.S. PATENT DOCUMENTS

| 3,184,022 | A | * | 5/1965 | Olson ........................ 192/58.91 |
| 5,092,433 | A | * | 3/1992 | Endo ............................ 188/290 |
| 5,711,404 | A | * | 1/1998 | Lee ............................. 188/158 |
| 5,848,953 | A | * | 12/1998 | Wei et al. .................... 188/164 |
| 5,851,165 | A | * | 12/1998 | Wei et al. .................... 188/164 |
| 5,879,273 | A | * | 3/1999 | Wei et al. .................... 188/164 |
| 6,176,783 | B1 | * | 1/2001 | Lindsay et al. .............. 188/290 |
| 6,273,845 | B1 | * | 8/2001 | Liou ............................ 188/164 |
| 6,345,703 | B1 | * | 2/2002 | Peng ........................... 188/164 |

FOREIGN PATENT DOCUMENTS

| JP | 1-22070 | 6/1989 |
| JP | 7-2936 | 1/1995 |
| JP | 7-44707 | 10/1995 |
| JP | 8-218726 | 8/1996 |
| JP | 08-093312 | 9/1996 |
| JP | 09-060678 | 4/1997 |

* cited by examiner

*Primary Examiner*—Robert A. Siconolfi
(74) *Attorney, Agent, or Firm*—Merchant & Gould P.C.

(57) ABSTRACT

To provide a rotary damper having a compact shape with a short axial length and capable of absorbing an extremely high torque acting temporarily in the case of a door abruptly closing. In a rotary damper (1) in which a rotary member (5) includes: a basement portion (6) axially supported by a drive shaft (4); a torque adjustor (7) capable of relatively moving on the drive shaft (4); a slide member (8) positioned through and facing the torque adjustor (7); and a spring (9) for energizing the slide member (8) to a cam, the slide member (8) is moved in the radial direction by relatively moving the torque adjustor (7) to a position having a predetermined angle against the drive shaft (4), and a predetermined radial clearance is formed between an outer surface (8b) of the slide member (8) and an inner peripheral surface (3a) of a chamber, thereby changing the clearance to change a torque generated by the rotation of the rotational member (5).

12 Claims, 28 Drawing Sheets

ROTARY DAMPER

BACKGROUND OF THE INVENTION

1. Field of the Invention

The present invention relates to a rotary damper capable of sliding a sliding portion constituted of an rotary member radially along a basement portion and capable of adjusting the magnitude of a torque generated, and to a rotary damper generating a torque by narrowing a clearance between the outer surface of an oscillation member oscillated by the force of more than the regular amount generated by the rotation of a drive shaft and the inner peripheral surface of a chamber.

2. Description of Prior Art

Hereto in the past, when an hanging door or the like which are left open are closed, there have been problems in that colliding sounds are generated and a door or a door frame is broken because the door collides with the door frame by an abrupt door closing operation. In order to prevent such an abrupt door closing operation, a variety of dampers for braking the door closing operation have been proposed.

For example, as shown in FIG. 14, Japanese Patent Laid-Open No. 8-93312 discloses a fluid friction resistance type braking device for use on a door closer which comprises a rotary drum 34 fixed to a braking shaft 33, an adjustment screw 35 screwed to a base portion 31A fixed to a lid body portion 31B of a body of equipment 31, a movable drum 36 screwed to this adjustment screw 35 and capable of moving along a groove 31C of die lid body portion 31B and one way clutch 37 transmitting a one way only rotational operation to the braking shaft 33.

Moreover, as shown in FIG. 15, such a damper apparatus is mounted on a sliding door in such way that a pinion 13 attached to the braking shaft 33 is engaged with a rack 12 fixed to a guide rail member 11 of the door frame side. When the door closing operation is performed, the rotational operation of the pinion 13 is transmitted to the braking shaft 33 by the clutch 37 and the door closing operation is braked. On the other hand, when the door opening operation is performed, the transmission of the rotational operation of the pinion 13 to the braking shaft 33 is prevented by the clutch 37.

However, such a damper apparatus is constituted in such a manner that, by moving the movable drum 36 axially inside the body of equipment 31, the contact and slide area between the outer peripheral surface of the movable drum 36 and the inner peripheral surface of the rotary drum 34 is changed so as to adjust the magnitude of a generated torque. Accordingly, when the generated torque has to be adjusted low in the magnitude, it is necessary to minimize the contact and slide area of both the above described surfaces. In such a case, it is necessary to separate largely radial surfaces of the movable drum 36 and the rotary drum 34. As a result, there was a disadvantage that it was impossible to make a length of a damper main body in the axial direction short.

Furthermore, in the case when a door is abruptly closed, very high load temporarily operates the door. However, since the magnitude of the torque generated by the damper apparatus is a fixed quantity, it is impossible to absorb the above described high load, and enough damper effect cannot be obtained. As a result, the door closing operation is not braked, the problem arises that the generation of colliding noises and the breakdown of the door due to collision of the door to a door frame or the like is not preventable.

BRIEF SUMMARY OF THE INVENTION

Object of the Invention

Hence, there has been a desire for a compact damper with a short radial length or a damper capable of absorbing an extremely high load which acts temporarily when the door is abruptly closed.

SUMMARY OF THE INVENTION

The rotary damper according to a first invention for solving the above described problem, wherein a housing with its inside provided with a chamber, a drive shaft with its base end side housed inside the chamber, a rotary member housed inside the above described chamber axially supported by the drive shaft and a viscous fluid filled inside the above described chamber are provided and a torque is generated by the rotation of the above described rotary member, the rotary damper generating a torque by the rotation of the above described rotary member, wherein the above described rotary member is provided with a basement portion axially integrally rotatably supported by the above described drive shaft, a torque adjustor capable of making a relative movement by action of the external force of more than the regular amount while maintaining a fixed relationship with the above described drive shaft, a slide member arranged axially movably and having an outer surface complementary to a part of the inner peripheral surface of the above described chamber and a spring means for energizing the slide member against the above described torque adjustor, and wherein, by relatively moving the above described torque adjustor against the above described drive shaft, the above described slide member is allowed to slide radially along the above described basement portion in such a manner as to change a radial clearance between the outer surface of the above described slide member and the inner peripheral surface of the above described chamber, thereby changing a rotary torque of the above described rotary member.

By allowing the slide member to slide along the base portion so as to control a radial clearance formed between its outer surface and inner peripheral surface, the torque generated based on the sheering resistance of the viscous fluid existing in this clearance can be changed and therefore no limitation is imposed in relation to the radial length of the damper main body.

The above described torque adjustor comprises an adjustment ring integrally rotatably attached to the above described rotary member and a cam member attached to the outer periphery of the adjustment ring, wherein the outer periphery of the above described adjustment ring and the inner periphery of a center hole of the above described cam member are engaged with a concave portion formed on the one and a convex portion on the other, wherein the concave portion and convex portion are constituted in such a manner that, when the external force of more than the regular amount acts on the above described cam member, the above described cam member is allowed to swing at the predetermined angle relatively against the above described adjustment ring and the above described drive shaft. In this way, the torque adjustor can be certainly arranged at the predetermined angle against the drive shaft.

By allowing the outer periphery of the cam member of the above described torque adjustor to take the shape of oval, the distance from the center of the cam member to each contact portion with the slide member and the cam member can be continuously displaced.

The above described cam member has a radial projection portion projected outside of the above described housing and provides an action portion for swinging the above described torque adjustor at the predetermined angle relatively against the above described drive shaft on the tip of the above described projection portion. In this way, the torque adjustor can be easily swung till the position of the predetermined angle.

The above described torque adjustor comprises the cam member attached integrally rotatably to the basement portion of the above described rotary member and an adjustment member engaged with the cam member, wherein the above described cam member has a cam surface comprising a slant surface on the outer periphery, a joining portion joined axially at one side with the above described rotary member and a wall portion formed axially at the other side, wherein the above described adjustment member has an action surface engaged with the wall portion of the above described cam member axially at an inner end portion, and wherein the above described cam surface and the above described action surface are constituted in such a manner that, when the external force of more than the regular amount acts on the above described adjustment member, the position of the portion engaged with the above described wall portion of the above described cam member of the above described action surface moves axially, thereby allowing the above described cam member to move along the above described drive shaft. In this way, the cam member can be certainly arranged along the drive shaft with the predetermined distance.

The adjustment member has an outer end portion projected outside of the above described housing and provides an action portion for moving the above described cam member along the above described drive shaft on the above described outer end portion. In this way, the cam member can be certainly moved to the predetermined position along the drive shaft.

The energization force of the above described spring means which is the predetermined centrifugal force acting on the above described slide member by the rotation of the rotary damper was, for example, set smaller than the centrifugal force generated when the number of revolutions of the drive shaft are increased with a high load temporarily acted on a hanging door or the like.

Because the centrifugal force generated in this way is allowed to become equal to or more than the energization force of the spring means, the slide members attempt to separate respectively from a state of being energized to the torque adjustor by opposing to the energization force of the spring means. As a result, the radial clearance formed between the outer surface of the slide member and the inner peripheral surface of the chamber can be temporarily made much narrower, thereby absorbing a temporal high load and allowing a full braking force to act on the hanging door or the like.

Moreover, when the number of revolutions of the drive shaft returns to the initial number, the slide member is energized again to the torque adjustor by the spring means and returns to a state where the torque originally set can be generated.

The slide member comprises a pair of the members arranged respectively radially at both sides of the chamber through the torque adjustor. Because the total area of the outer surface of the slide member which faces the inner periphery surface of the chamber can be taken large, the generated torque can be set high.

Moreoover, the slide member comprises a single member arranged at one side of the torque adjustor in the radial direction of the chamber. Because the total area of the outer surface of the slide member which faces the inner periphery surface of the chamber can be set small, the generated torque can be made low.

The rotary damper according to a 2nd invention, wherein a housing with its inside provided with a chamber, a drive shaft with its basement end housed inside the chamber, a rotary member housed inside the above described chamber axially supported by the drive shaft and a viscous fluid filled inside the above described chamber are provided and a torque is generated by rotation of the above described rotary member, the rotary damper generating a torque by the rotation of the above described rotary member, wherein the above described rotary member is provided with the basement portion axially integrally rotatably supported by the above described drive shaft, an oscillation member attached oscillatorily to the basement portion and having an outer surface complementary to a part of the inner peripheral surface of the above described chamber, and a spring means interposed between the above described oscillation member and the above described base portion for allowing the oscillation member to oscillate when the force of more than the regular amount acts on the oscillation member, and wherein by oscillating the above described oscillation member against the above described basement portion by the above described force of more than the regular amount generated by the rotation of the above described drive shaft, the clearance between the outer surface of the oscillation member and the inner peripheral surface of the above described chamber is narrowed, thereby generating a torque.

When the shearing resistance of the viscous fluid by the rotation of the drive shaft becomes equal to or more than the resistance of the spring means, the oscillation portion oscillates so as to generate a rotational torque. When the rotational speed of the drive shaft becomes high temporarily, a high torque can be obtained immediately and, thereafter, as the rotational speed becomes slow, the torque can be reduced as well.

The above described basement portion is extended to both sides radially from an axial support portion attributable to the above described drive shaft and the above described oscillation member is allowed to comprise a pair of members attached respectively to both ends of the above described basement portion. When the oscillation portion oscillates, a total area of the outer surface of the portion can be taken largely so that a generated torque can be made high.

The above described basement portion is extended to one side radially from an axial support portion attributable to the above described drive shaft and the above described oscillation member is allowed to comprise a single member attached to an outside end of the above described basement portion. When the oscillation portion oscillates, a total area of the outer surface of the portion can be taken small so that a generated torque can be made low.

DETAILED DESCRIPTION OF THE PREFERRED EMBODIMENTS

Figure 1:
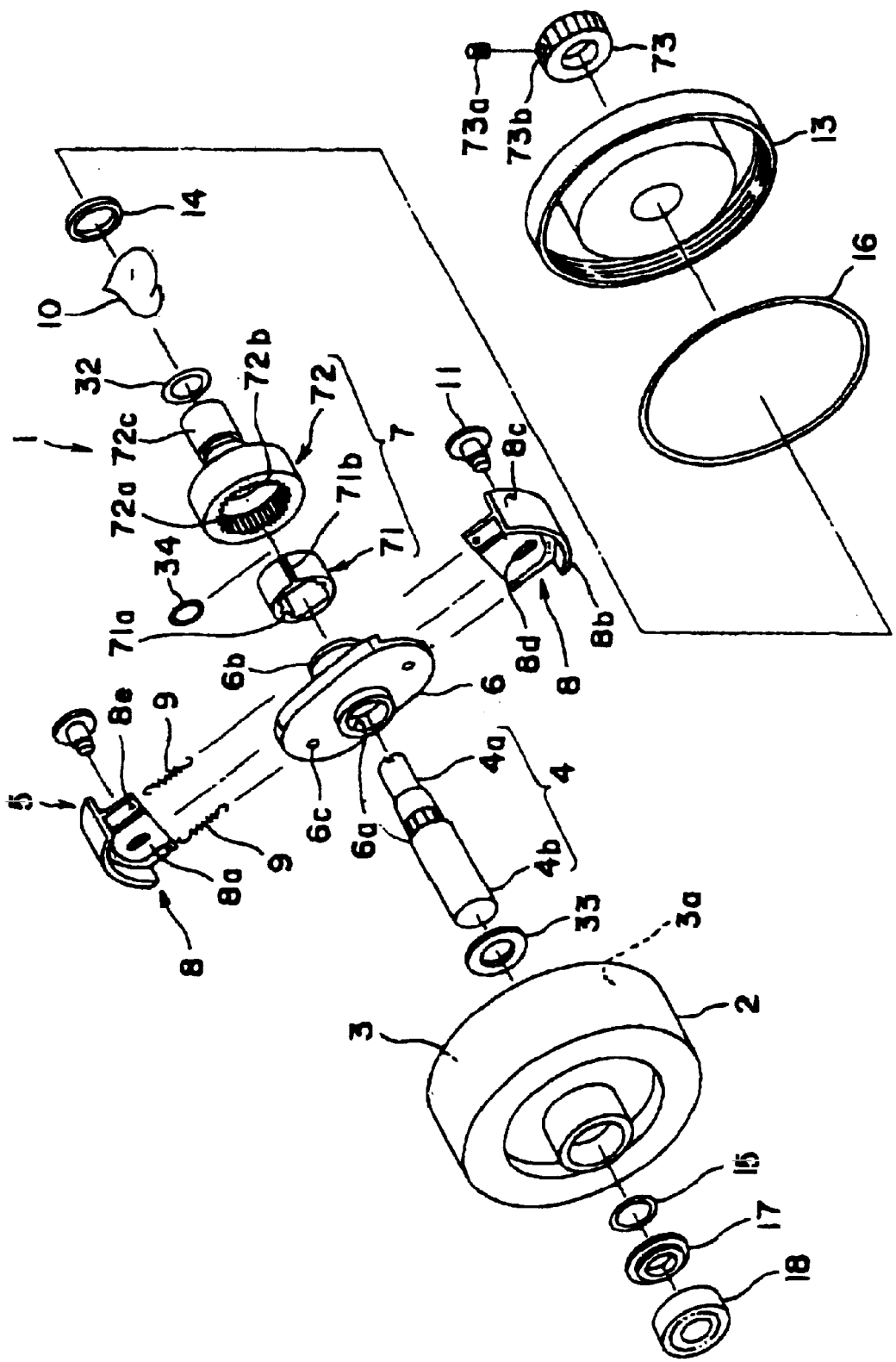
FIG. 1 is an exploded oblique view of a rotary damper according to a 1st configuration example of the present invention.
Figure 2:
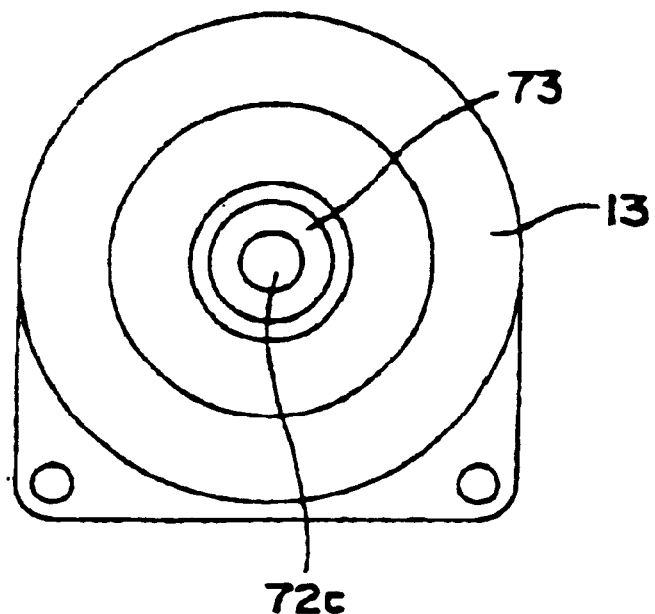
FIG. 2 is a right side view of the same rotary damper.

A 1st configuration example of a rotary damper according to a 1st invention of the present invention will be described based on the drawings attached hereto. FIG. 1 is an exploded oblique view of the present rotary damper, FIG. 2 is a right side face view, FIG. 3 is an inside explanatory drawing with a lid taken out in FIG. 2 and FIG. 4 is a sectional view cut along A—A line of FIG. 3.

Figure 3:
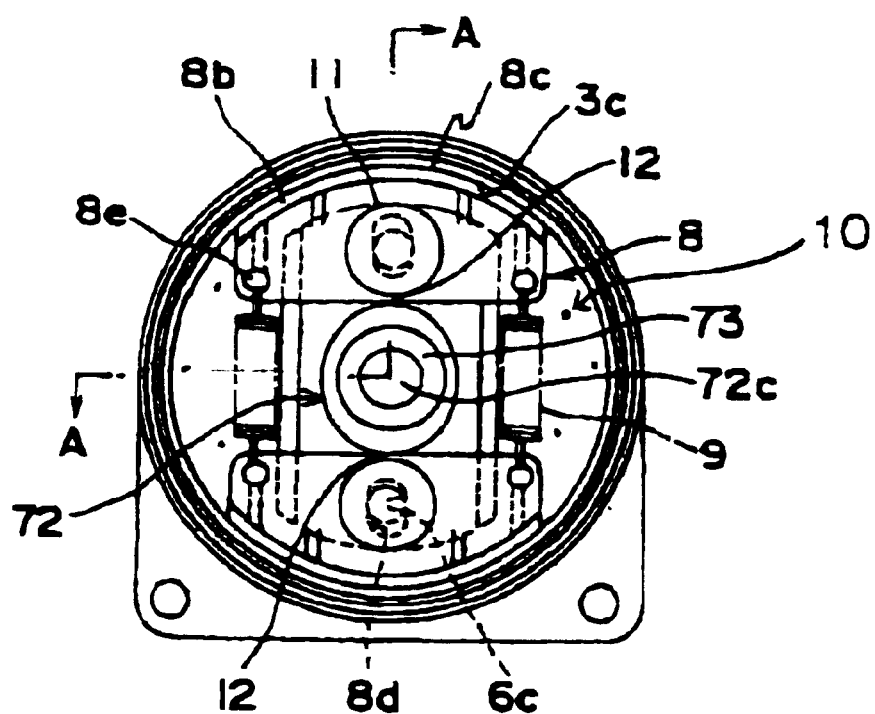
FIG. 3 is an inside explanatory drawing with a lid taken out in FIG. 2.
Figure 4:
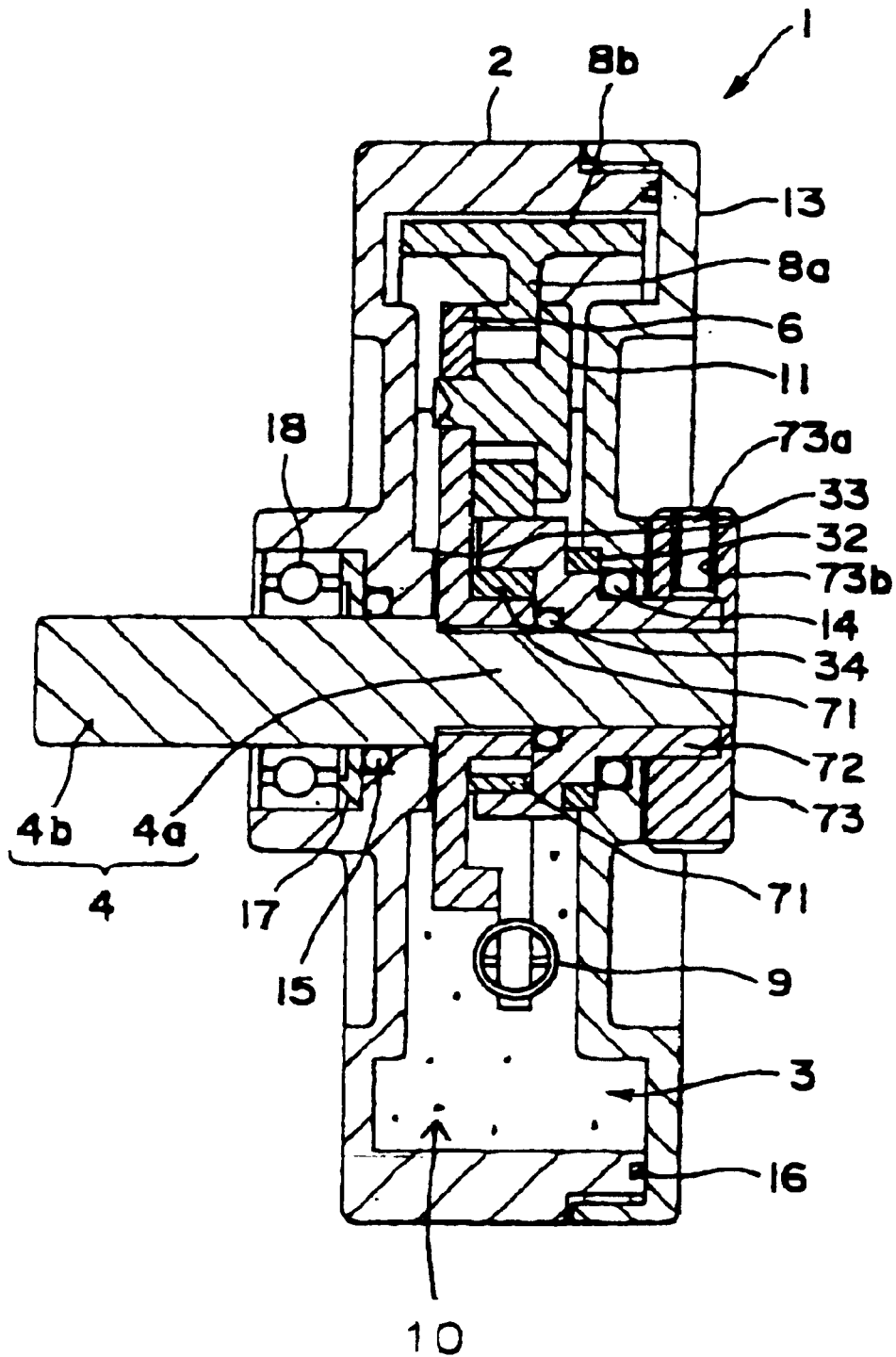
FIG. 4 is a sectional view cut along A—A line in FIG. 3.
Figure 5:
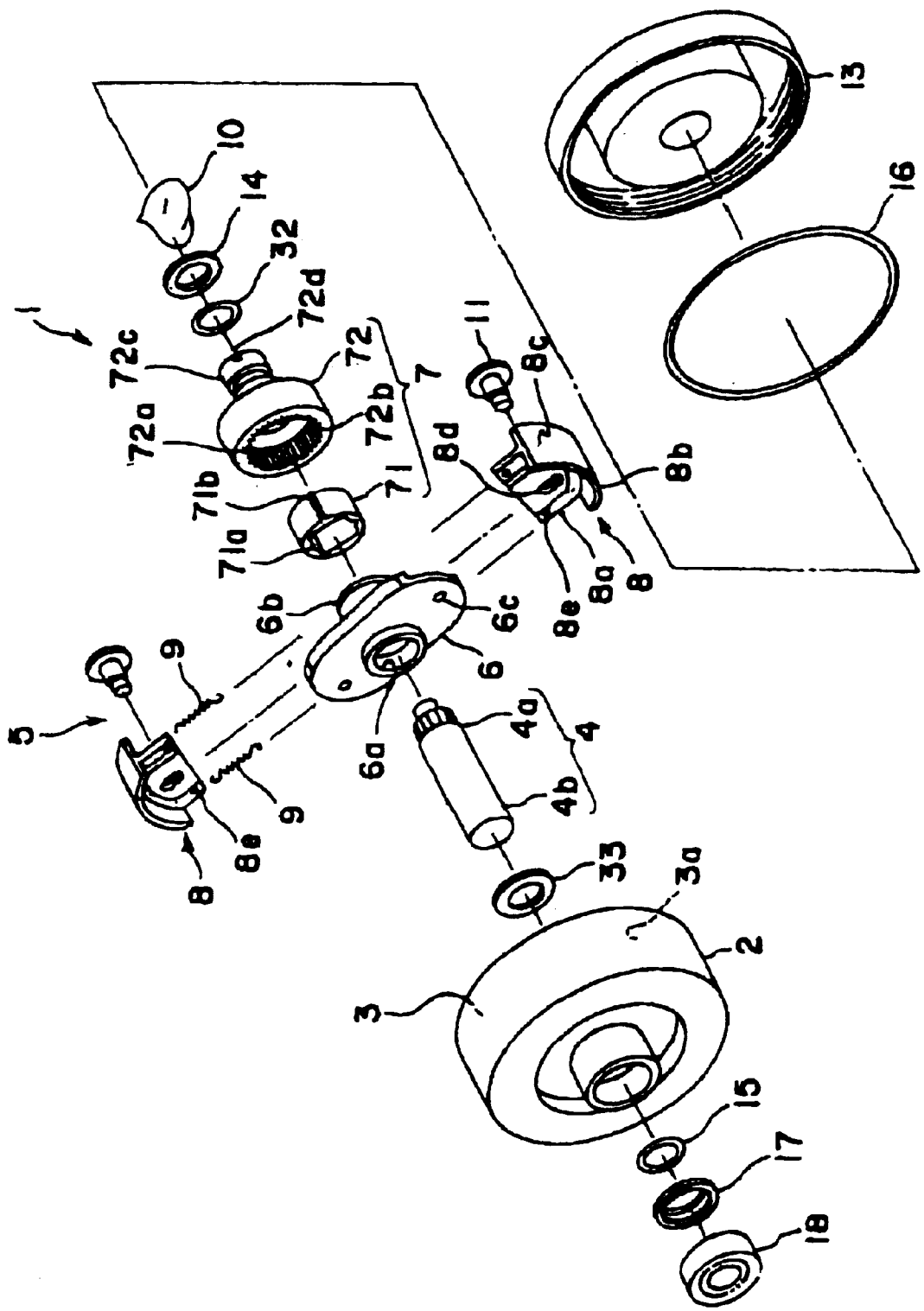
FIG. 5 is an exploded oblique view of a rotary damper according to a 2nd configuration example of the present invention.
Figure 6:
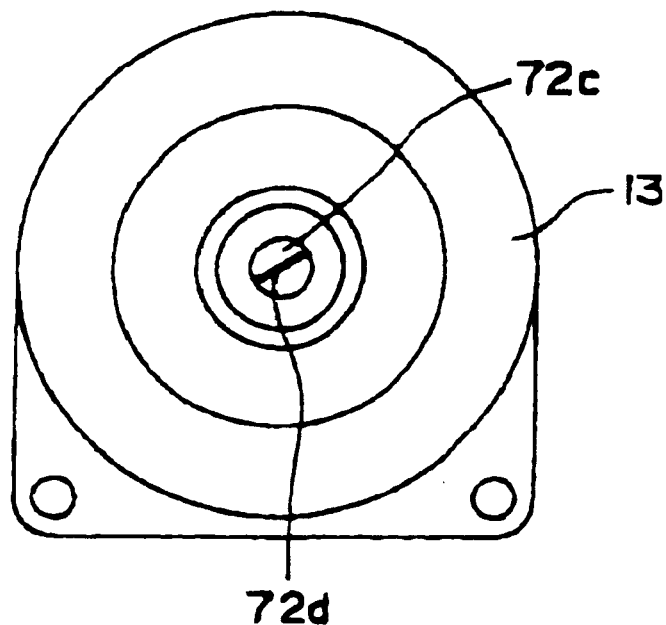
FIG. 6 is a right side view of the same rotary damper.
Figure 7:
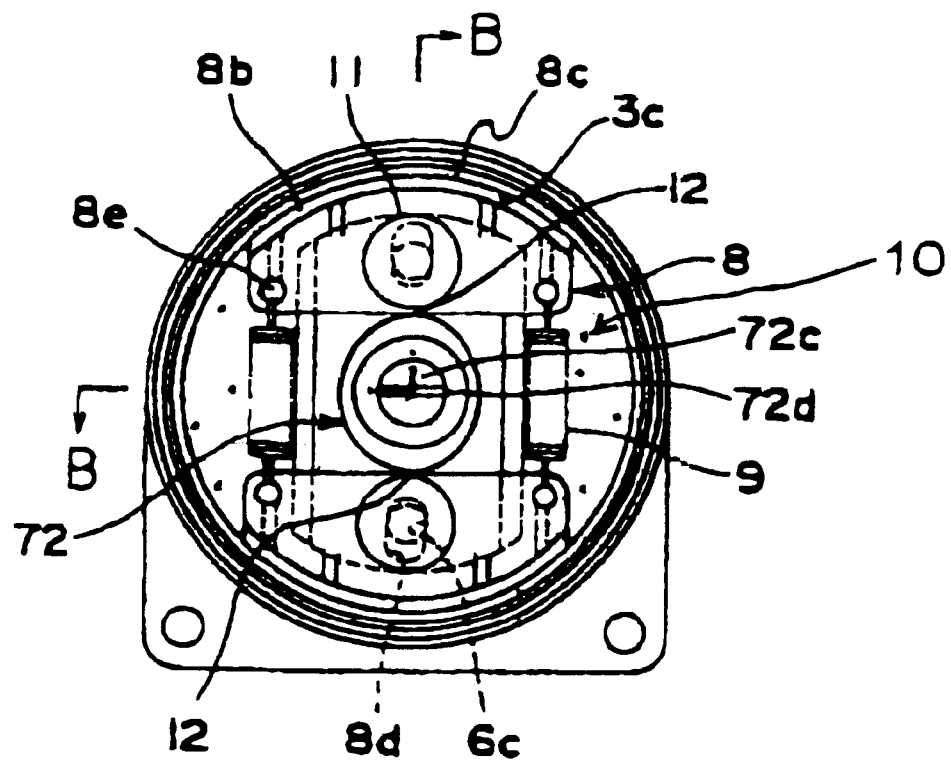
FIG. 7 is an inside explanatory drawing with a lid taken out in FIG. 6.

As shown in FIG. 1, FIG. 3 and FIG. 4, a rotary damper 1 of the present invention houses a basement end side 4a of a drive shaft 4 in a chamber 3 inside a housing 2 and axially supports a rotary member 5 at this basement end side 4a and has a structure where a viscous fluid 10 is filled inside the chamber 3 and can rotate the rotary member 5 relatively to the housing 2.

Here, the rotary member 5 is composed of a basement portion 6 of an approximately oval shape axially supported by inserting the basement end side 4a of the drive shaft 4 into a shaft hole 6a, a torque adjustor 7 attached to a round projection portion 6b disposed on one side of the basement portion 6, a pair of slide members 8, 8 disposed in opposite positions through the torque adjustor 7 while contacting it and a pair of tension spring means 9, 9 for energizing a pair of these slide members 8, 8 against the torque adjustor 7. Note that the torque adjustor 7 is composed of an inside adjustment ring 71 attached to the round projection portion 6b, an outside oval shaped cam member 72 attached to and engaged with this adjustment ring 71 and an adjustment knob 73.

On one side of the basement portion 6 is disposed the round projection portion 6b and, by allowing two engaged convex portions (not shown) formed on the outer surface of this projection portion 6b to engage respectively with two concave portions 71a, 71a formed in the inner surface of the adjustment ring 71, the adjustment ring 71 is attached non-rotatably to the basement portion 6.

The adjustment ring 71 and the cam member 72 are constituted in such a manner as to engage with a concave portion formed on the one and a convex portion formed on the other of the outer periphery of the adjustment ring and the inner periphery of the cam member center hole.

For example, as shown in FIG. 1, a configuration is adapted wherein two convex portions 71b, 71b are disposed axially along the outer periphery of the adjustment ring 71 and a plurality of projections 72a are disposed axially along the inner periphery of the cam member 72. When the cam member 72 is rotated against the drive shaft 4 through the adjustment ring 71, the projections 72a of the cam member 72 run across the convex portion 71b of the adjustment ring 71 one after another, thereby stopping the rotation to bring about a state where the concave portion 72b between the projections 72a, 72a is engaged with the convex portion 71b.

In place of such a configuration, a concave portion is disposed axially along the outer surface of the adjustment ring 71 and a plurality of convex portions are formed axially along the inner surface of the cam member 72 and, by the stop of the rotation of the drive shaft, the concave portion of the outer surface of the adjustment ring 71 may be engaged with the convex portions of the inner surface of the cam member 72.

As shown in FIG. 1 and FIG. 4, an adjustment knob 73 as an action portion is engaged with the end portion of a shaft 72c of the cam member 72. The adjustment knob 73 comprises a ring-shaped main body, a screw hole 73b along the radial direction of the main body and a screw 73a screwable thereto. While screwing the screw 73a into the screw hole 73b and by pressing the end surface of the screw 73a against the outer surface of the shaft 72c, the adjustment knob 73 is fixed to the cam member 72. By rotating the adjustment knob 73, the earn member 72 can be easily rotated with respect to the basement portion 6.

Figure 33:
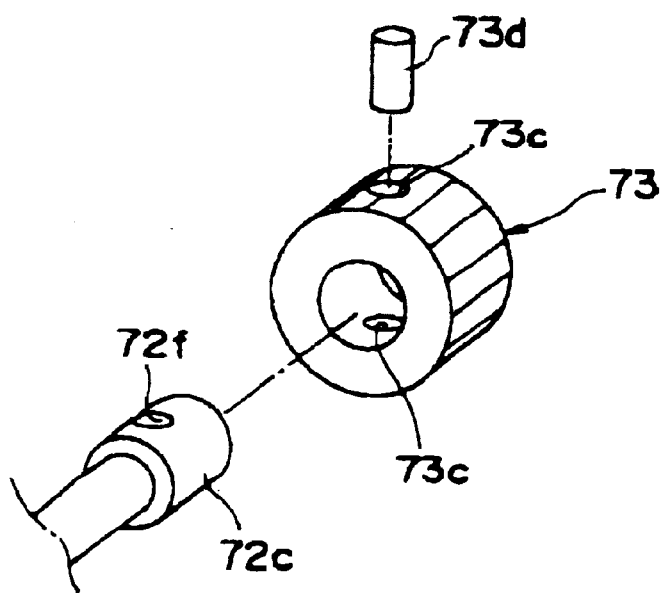
FIG. 33 is an oblique view showing the modified example of the action portion of the torque adjustor.
Figure 34:
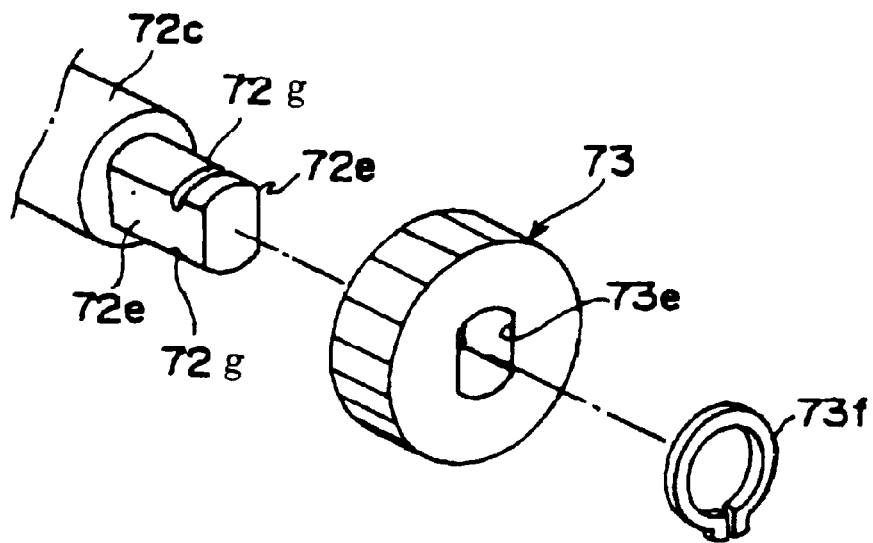
FIG. 34 is an oblique view showing the modified example of the action portion of the torque adjustor.

With regard to the method of fixing the adjustment knob 73 as the action portion to the end portion of the shaft 72c of the cam member, in addition to other than the above described, the method, for example, as shown in FIG. 33 and FIG. 34, may be adapted.

In an example as shown in FIG. 33, holes 73c, 73c are disposed along the radial direction of the ring shaped main body of the adjustment knob 73. The two holes 73c are disposed in opposite positions against the center of the ring shaped body and the center axes of these two holes lie on a straight line. On the other hand, a hole 72f is disposed also in the end portion of the shaft 72c of the cam member. A ring shaped main body of the adjustment knob 73 is engaged with the end portion of the shaft 72c of the cam member so that the center axes of the two holes 73c and 72f are aligned on a straight line. By inserting press fit pins 73d such as a wave spring or the like into the two holes 73c and 72f, the adjustment knob 73 is fixed to the end portion of the shaft 72c of the cam member. Note that, as the press-fit pin, MATSUBA pin, DARUMA pin or the like may be used in addition to the wave sprig.

In an example as shown in FIG. 34, cut surfaces 72e, 72e are disposed axially along the end portion of the shaft 72c of the cam member, and grooves 72g, 72g are disposed in the peripheral direction along the peripheral surface of the portion which is not cut on the other hand, a hole 73e having a complementary shape to the end portion of the shaft 72c is disposed in the ring shaped main body of the adjustment knob 73. The end portion of the shaft 72c is inserted into the hole 73e as if the grooves 72g, 72g are projected outside from the hole 73e and a retaining ring 73f is mounted on the grooves 72g, 72g.

The adjustment knob 73 is in non-rotatable state as well as non-loose state against the shaft 72c of the cam member and, in this way, the adjustment knob 73 is fixed to the end portion of the shaft 72c of the cam member.

Each slide member 8 is composed of a sliding portion 8a radially sliding along the surface of the basement portion 6 at the side where the round projection portion 6b is disposed and an outer wall 8b attached radially to the outer end of the sliding portion 8a, and the outer wall 8b has a complementary shape 8c to the inner peripheral surface 3a of the chamber 3. In the sliding portions 8a, 8a of each slide member 8, long holes 8d, 8d corresponding respectively to holes 6c, 6c formed longitudinally at both end portions of the basement portion 6 are disposed. By passing a pressure pin 11 through the hole 6c and the long hole 8d, each slide member 8 is radially movable in the chamber 3 within the clearance range of the long hole 8d.

In the radial inner end portion of the slide portion 8a of each slide member 8, a pair of holes 8e, 8e are disposed adjacent to both the ends thereof. The holes 8e, 8e of the one sliding portion 8a and the opposing holes 8e, 8e of the other sliding portion 8a are joined respectively by the tension spring means 9, 9. By the tensile force of the tension spring means 9, a pair of slide members 8, 8, are adjacently energized to a cam member 72 of the torque adjustor 7.

Next, the operation or the like of the rotary damper 1 constituted in such a manner will be described.

The damper 1 constituted in such a manner is, for example, used by fixing the housing 2 to a hanging door and by engaging the other end side 4b of the above described drive shaft 4 with a rack parallel to the guide rail of the hanging door through a pinion or the like.

When the hanging door is closed, the rotational operation of the hanging door is transmitted to the drive shaft 4 of the rotary damper 1 and, accompanied by the rotation of the drive shaft 4, the rotary member 5 starts to rotate. Here, because a clearance having a predetermined interval is formed between the outer surfaces 8c, 8c of a pair of the slide members 8 and the inner peripheral surface 3a of the chamber 3, a shearing force acts on the viscous fluid 10 existing in the above described clearance by the rotation of the slide member 8 so as to cause a rotational torque, thereby generating the rotational torque as a braking force.

With the drive shaft fixed so as not to rotate and the adjustment knob 73 turned, the cam member 72 is rotated until the predetermined angle against the drive shaft 4, thereby obtaining the desired rotational torque.

That is, when the projection portions 72a of the inner surface of the cam member 72 rotate so as to run across the convex portion 71b of the outer surface of the adjustment ring 71 one after another, the outer surface of the cam member 72 contacts both slide members 8, 8 and at the same time allows the slide members 8, 8 to separate from one another or to be in close proximity to each other. When the clearance formed between the outer surface 8c of the slide member 8 and the inner peripheral surface 3a of the chamber 3 gives the desired interval, the rotation of the cam member 72 is stopped. In this way, by relatively rotating the cam member 72 to a predetermined angle against the drive shaft 4, the torque to be generated when the rotary member rotates can be set at the desired magnitude.

In the present rotary damper 1, the convex portion 71b of the outer surface of the adjustment ring 71 is in a state of being engaged with the concave portion 72b between the projections 72a of the inner surface of the cam member 72, and the cam member 72 remains at rest. Therefore, the cam member 72 of the torque adjustor can be certainly arranged at the predetermined angle against the drive shaft 4.

By the way, because the cam member 72 is oval shaped, accompanied by the rotation of the cam member 72, the distance from the center of the cam member 72 (hereinafter referred to as central distance) to each contact portions 12, 12 with the slide member 8 and the cam member 72 can be continuously changed. Accordingly, a value of the torque generated by the rotation can be set as a consecutive value so that a fine adjustment of the braking force can be made.

Note that the cam 72 may not be limited to an oval shape if the central distance can change as it rotates, but it may adapt a shape where the desired change of the central distance can be obtained accompanied by the rotation of the cam 72.

In order to increase the magnitude of the generated torque, the central distance is increased from the initial distance by the rotation of the cam member 72, and the clearance formed between the outer surface 8c of the slide member 8 and the inner peripheral surface 3c of the chamber 3 is more narrowed on the contrary, when the central distance is decreased from the initial distance, the clearance formed between the outer surface 8c of the slide member 8 and the inner peripheral surface 3a of the chamber 3 becomes much wider and, as a result, the torque generated by the rotation is reduced.

Moreover, when a high load acts temporarily on the door or the like attached with the rotary damper 1, the number of revolutions of the drive shaft 4 increases abruptly so that the abrupt closing operation of the door or the like occurs. At this time, a great centrifugal force corresponding to the number of revolutions of the drive shaft acts temporarily on each slide member 8.

In the rotary damper 1 according to the present invention, because the tensile force of the tension spring 9 is set smaller than the centrifugal force based on the abrupt door closing operation, even if such abrupt door closing operation takes place, by opposing to the tensile force of the tension spring 9 with the centrifugal force becoming equal to or more than that force, each slide member 8 is separated from the torque adjustor 7 and at the same time is temporarily moved outward along the basement portion 6 in the radial direction of the chamber 3. As a result, the radial clearance formed between each outer surface 8c of each slide member 8 and the inner peripheral surface 3a of the chamber 3 is temporarily made much narrower, thereby making it possible to generate an extremely high torque.

In this way, accompanied with the action of a temporal high load, even if an abrupt door closing operation occurs, immediately thereafter, sufficient braking forces for absorbing such abrupt operation can be acted.

When the drive shaft restores the initial number of revolutions by the action of such braking forces, each slide member 8 is again energized by the tension spring 9 so as to contact the torque adjustor 7 and returns to the state where the initial torque is generated.

As shown in FIG. 4, the other end portion 4b of the drive shaft 4 is engaged with and mounted to in order from the inner side a slider 33, a housing 2, an O-ring 15 and a plate 17 and finally is projected outside of the housing by axially supporting a bearing 18 and, for example, joined with the pinion or the like (not shown). The other side of the housing 2 (the right side in the drawing) is closed by a lid 13 while interposing a O-ring 14 for use of leakage prevention of the viscous fluid 10 and a bush 32 between the cam members 72 of the torque adjustor 7. A O-ring 34 between the cam member 72 and the drive shaft 4, a O-ring 15 between the housing 2 and the drive shaft 4 and a O-ring 16 between the housing 2 and the lid 13 are also for the purpose of preventing the leakage of the viscous fluid 10 from the chamber 3.

Next, the rotary damper according to the configuration examples other than the 1st invention will be shown hereunder. In these configuration examples, only the portion different from the above described 1st configuration example will be described.

First, the rotary damper according to the 2nd configuration example will be described based on FIG. 5 to FIG. 8. Note that FIG. 5 to FIG. 8 correspond respectively to FIG. 1 to FIG. 4 showing the 1st configuration example and FIG. B is a sectional view cut along B—B line in FIG. 7. In this configuration example, an adjustment groove 72d as the action portion is disposed on the end surface of the shaft portion 72c of the cam member 72 and, for example, by inserting the tip of a minus driver into this adjustment groove 72d and turning it, the cam member 72 can be easily rotated against the basement portion 6.

Figure 8:
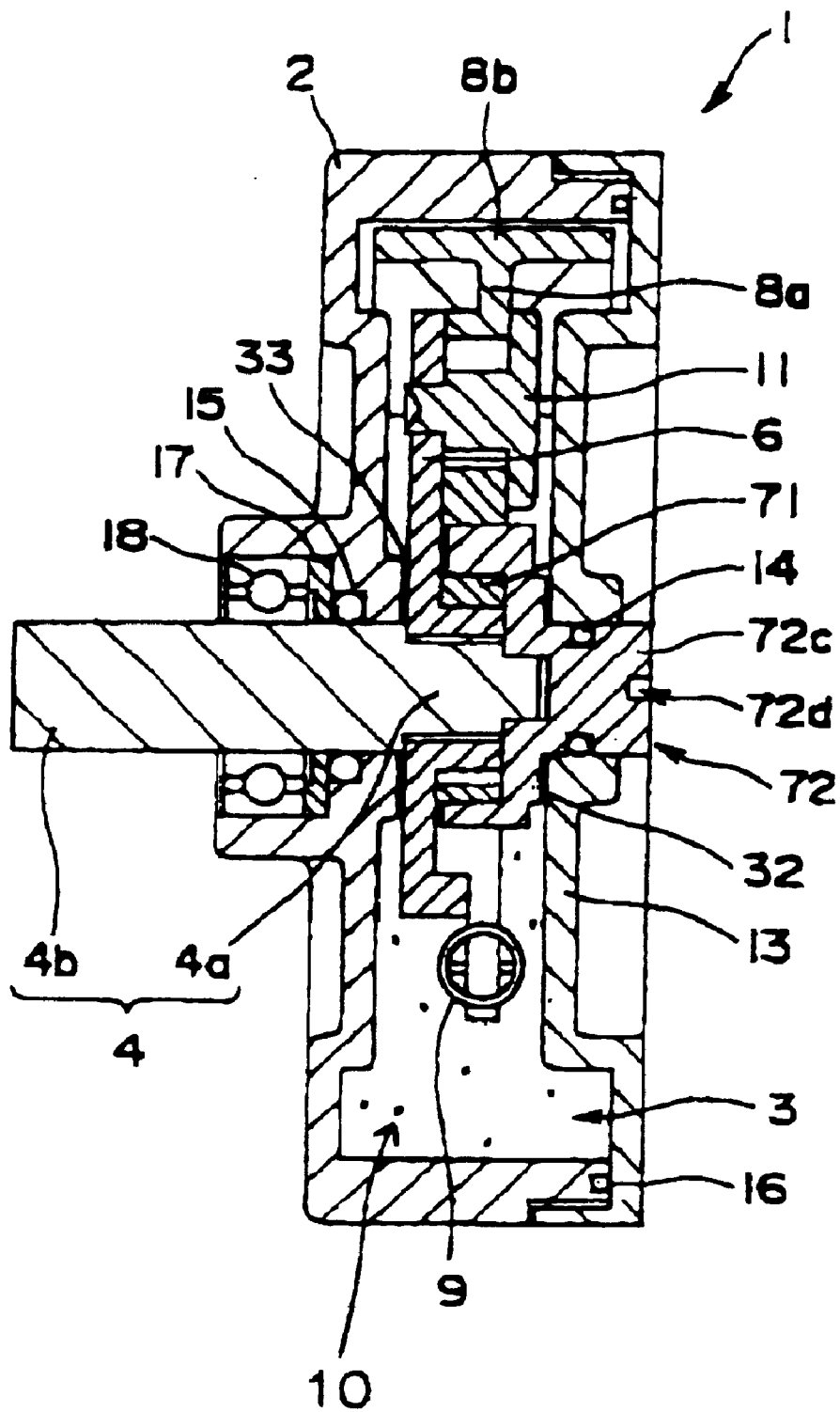
FIG. 8 is a sectional view cut along B—B line in FIG. 7.

As shown in FIG. 8, the other end side 4b of the drive shaft 4, similar to the 1st configuration example, is engaged with and mounted to in order from the inner side the slider 33, the O-ring 15, the housing 2 and the bearing 18. The other side (the right side in the drawing) of the housing 2 is closed by the lid 13 while interposing the O-ring 14 for use of the leakage prevention of the viscous fluid 10 and the slider 32 between the cam members 72 of the torque adjustor 7. The O-ring 15 between the housing 2 and the drive shaft 4 and the O-ring 16 between the housing 2 and the lid 13 are also for the purpose of preventing the leakage of the viscous liquid 10 from the chamber 3.

Figure 9:
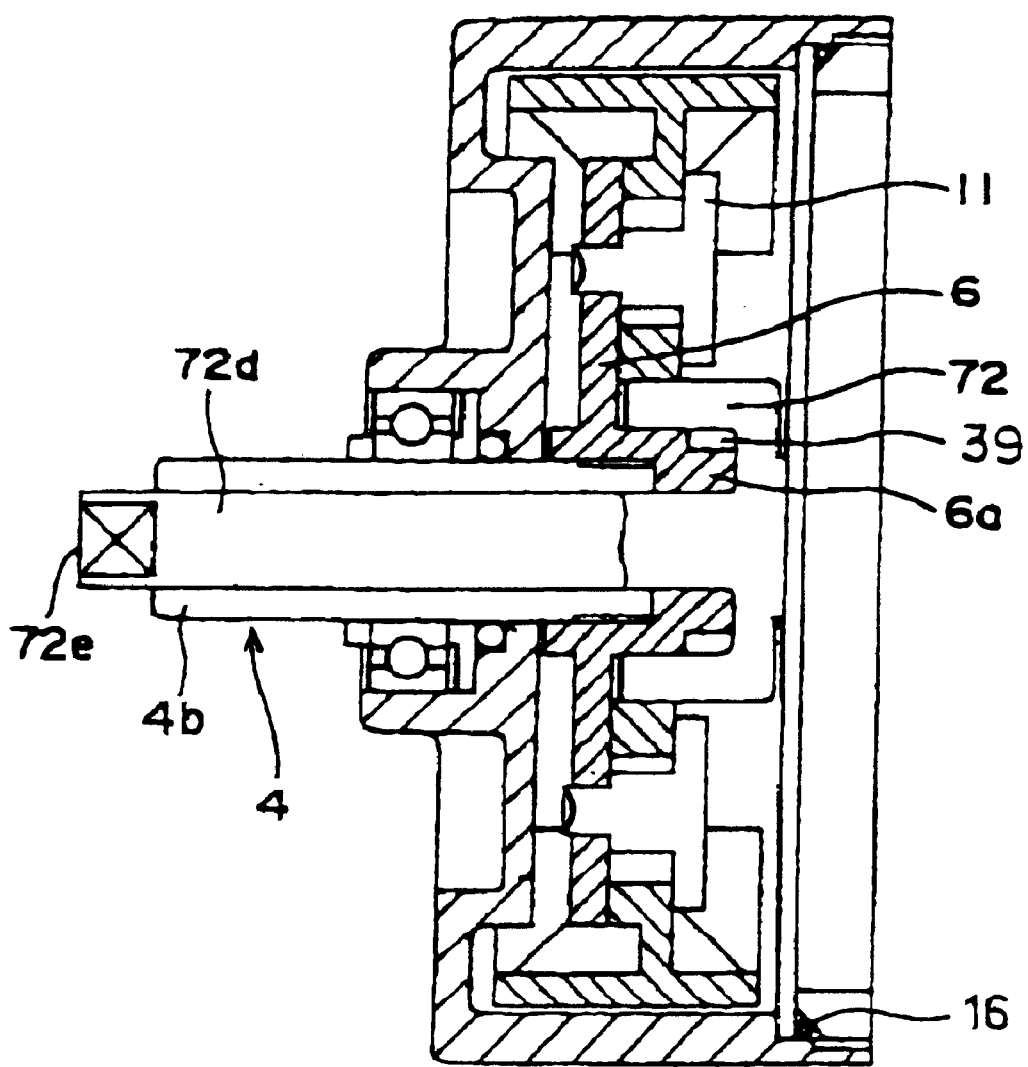
FIG. 9 is a sectional view of a rotary damper according to a 3rd configuration example of the present invention.

Next, the rotary damper according to the 3rd configuration example will be described based on FIG. 9. In this configuration example, as means for arranging the cam member 72 of the torque adjustor 7 in the predetermined position against the basement portion 6, a frictional force of the O-ring is utilized in place of the engagement between the concave portion 72b and the convex portion 71b.

In this configuration example, the drive shaft 4 is taken as a hollow shaft and the adjustment shaft 72d integrated with the cam member 72 is passed through this hollow portion, and the O-ring 39 is interposed between the inner surface of the cam member 72 and the round projection portion 6a of the basement portion 6. In this case, the outer end portion of the adjustment shaft 72d is taken as a D cut 72e and the drive shaft 4 is fixed so as not to rotate, and by oscillating the D cut 72e by cutting pliers or the like, the cam member 72 is rotated until the predetermined angle against the drive shaft 4.

Because the O-ring 39 is depressed to a certain extent, the stopped state of the cam member 72 can be almost certainly maintained, and there is the advantage that the cam member 72 can be extremely easily engaged with the basement portion 6.

Next, the rotary damper according to the 4th and the 5th configuration examples is constituted in such manner that the slide member is composed of a single member arranged at one side of the cam member in the radial direction of the chamber.

First, the rotary damper 1 according the 4th configuration example will be described based on FIG. 16. This configuration example fixes, in the first configuration example, one of the pair of slide members to the basement portion and allows the other slide member only to be movable radially and is similar to the first configuration example for the rest.

Figure 16:
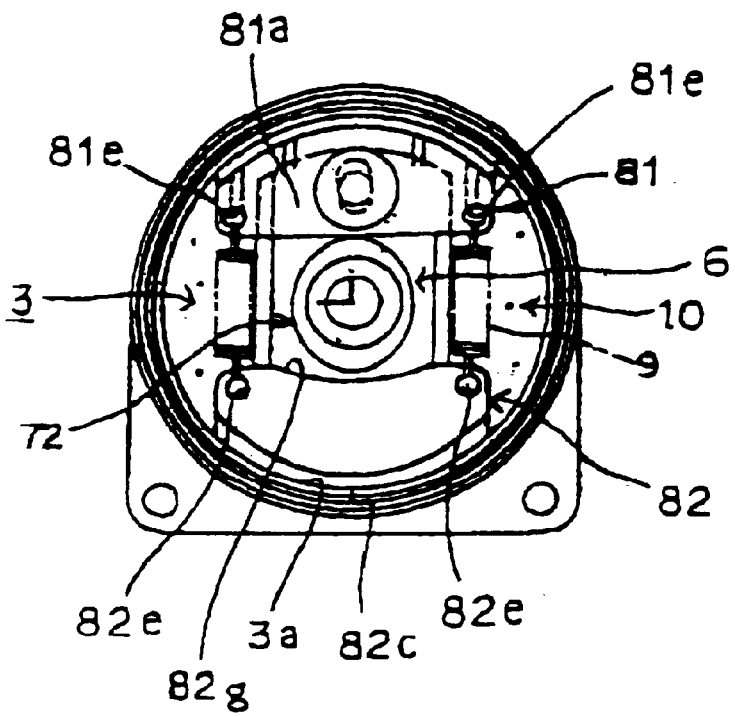
FIG. 16 is an inside explanatory drawing of the rotary damper according to a 4th configuration example of the present invention.

As shown in FIG. 16, a slide member 82 positioned in the lower part of the drawing is integrated with the basement portion 6 and its outer surface 82c is arranged in proximity to, but to a degree of not abutting against, an inner peripheral surface 3c of the chamber 3. On the other hand, holes 81e, 81e of a sliding portion 81a of a slide member 81 are joined respectively with holes 82e, 82e disposed in the slide member 82 through the tension springs 9, 9, and the slide member 81 is energized by a cam member 72. During the rotation of the cam member 72, the fixed slide member 82 is arranged to be separate from the cam member 72 so that the outer surface of the cam member 72 does not touch the inner surface 82g of the fixed slide member 82.

Next, the rotary damper according to the 5th configuration example will be described based on FIG. 17. This configuration example replaces, in the first configuration example, one of the pair of slide members by a fixed member and allows the other slide member only to be movable radially and is similar to the first configuration example for the rest.

Figure 17:
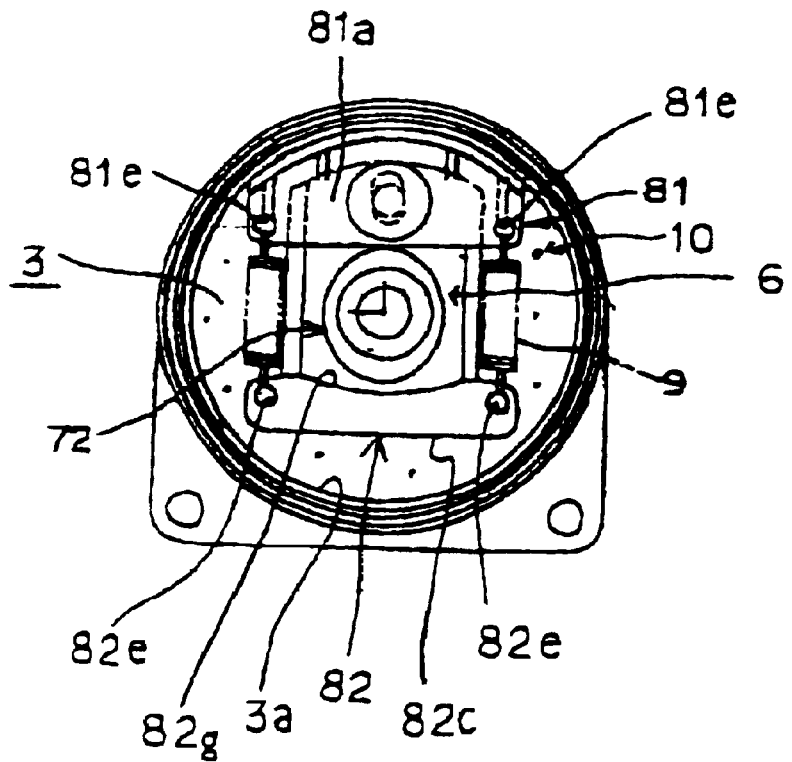
FIG. 17 is an inside explanatory drawing of the rotary damper according to a 5th configuration example of the present invention.

As shown in FIG. 17, the fixed member 82 is integrated with the basement portion 6 and is arranged in such way that a clearance exists between its outer surface 82c and the inner peripheral surface 3a of the chamber 3. On the other hand, the holes 81e, 81e of the sliding portion 81a of the slide member 81 positioned in the upper part of the drawing are joined respectively with the holes 82e, 82e disposed in the fixed member 82 through the tension springs 9, 9, and the slide member 81 is energized against the cam member 72. During the rotation of the cam member 72, the fixed member 82 is arranged to be separate from the cam member 72 so that the outer surface of the cam member 72 does not touch the inner surface 82g of the fixed member 82.

Note that the method of changing the above described central distance is not limited to the method of using the torque adjustor such as described in the above 1st to 5th configuration examples. For example, the method described hereinafter of using the torque adjustor comprising the cam member and the adjustment member engaged therewith may be adapted. The rotary damper 1 according to the 6th configuration example adapting such method will be described based on FIG. 26 to FIG. 32. Here, FIG. 26 shows an oblique view of the cam member, FIG. 27 an oblique view of the adjustment member, FIG. 28 and FIG. 29 sectional views of the rotary damper along the radial direction.

Figure 26:
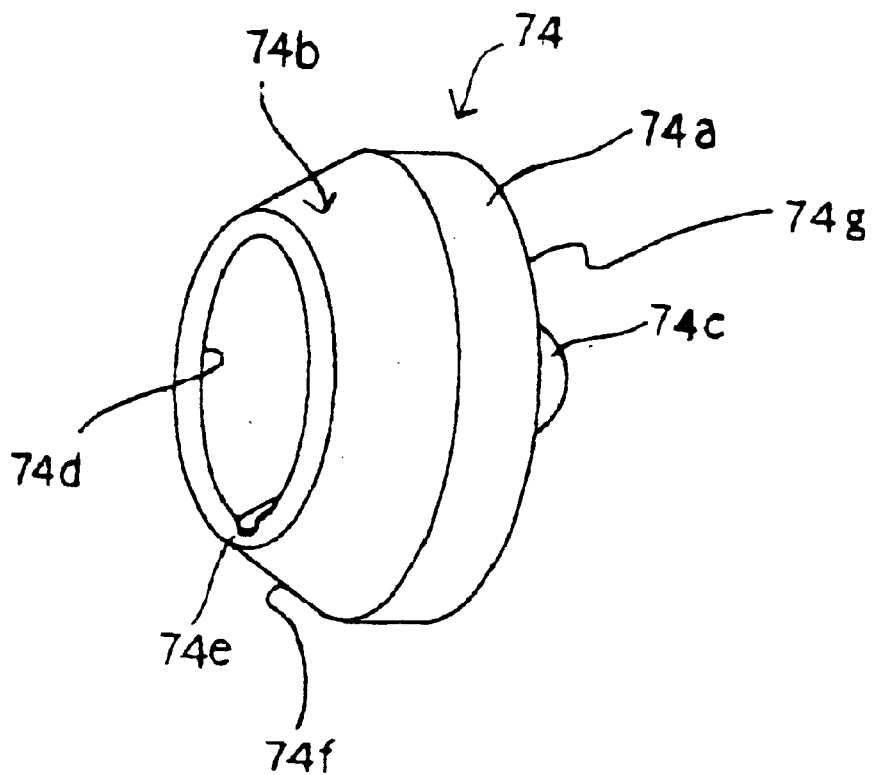
FIG. 26 is an oblique view showing a cam member of a torque adjustor used for the rotary damper according to the 6th configuration example of the present invention.

As shown in FIG. 26, the cam member 74 comprises a round substrate 74a having a wall portion at one side and a hollow conical base 74b at the other side of the round substrate 74a with its outer periphery taken as a conical surface 74f. A semi-spherical projection 74c is disposed in the above described wall portion side 74g. An engaging groove 74e is formed at an opening 74d of the conical base 74b.

Figure 27:
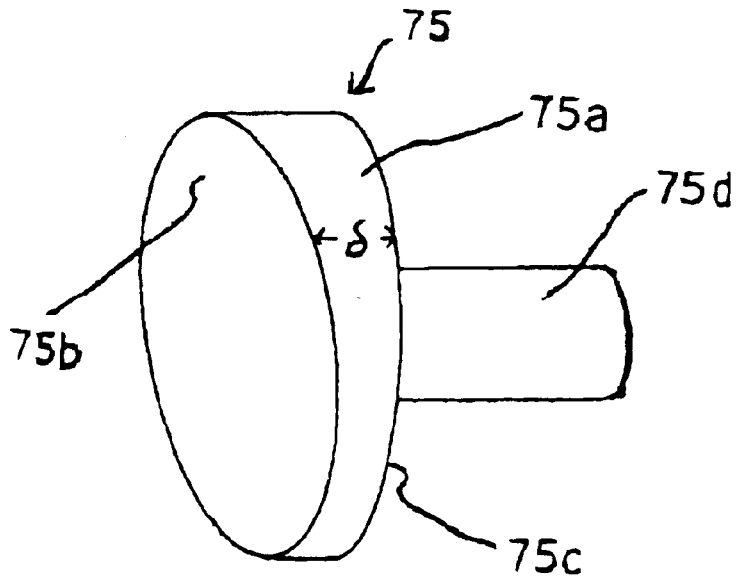
FIG. 27 is an oblique view showing an adjustment member of the torque adjustor used for the rotary damper according to the 6th configuration example of the present invention.

As shown in FIG. 27, the adjustment member 75 comprises a round substrate 75a which continuously changes an axial thickness δ so that one surface 75b becomes oval-shaped forming a radial slant surface and the other surface 75c becomes round-shaped and a bar 75d extended radially from the round substrate 75c. The slant surface 75b of the adjustment member 75 constitutes the action surface against which the semi-spherical projection 74c of the cam member 74 abuts and an external force acts.

Figure 28:
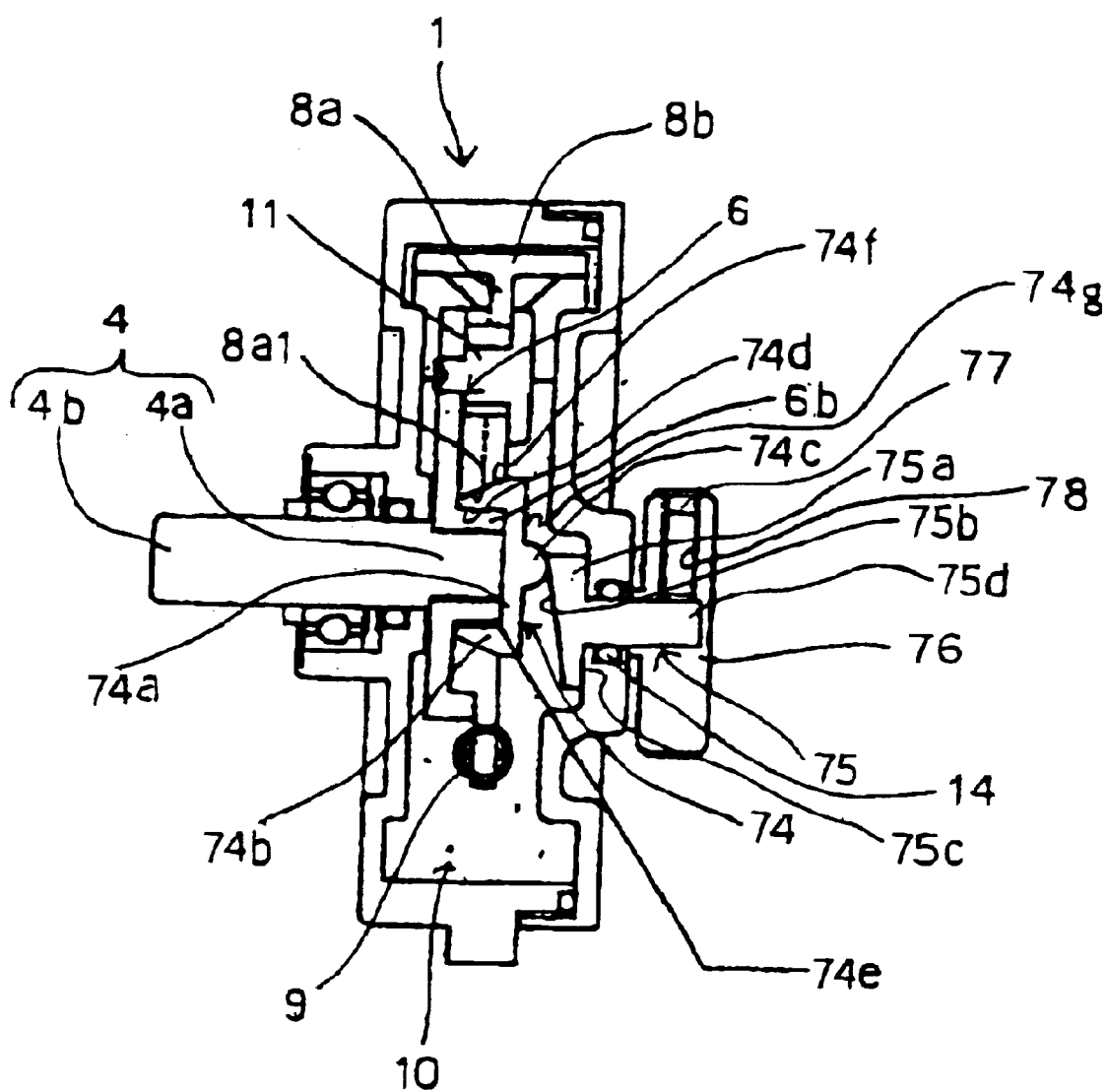
FIG. 28 is a sectional view of the rotary damper according to the 6th configuration example of the present invention in a state of generating the maximum torque.
Figure 29:
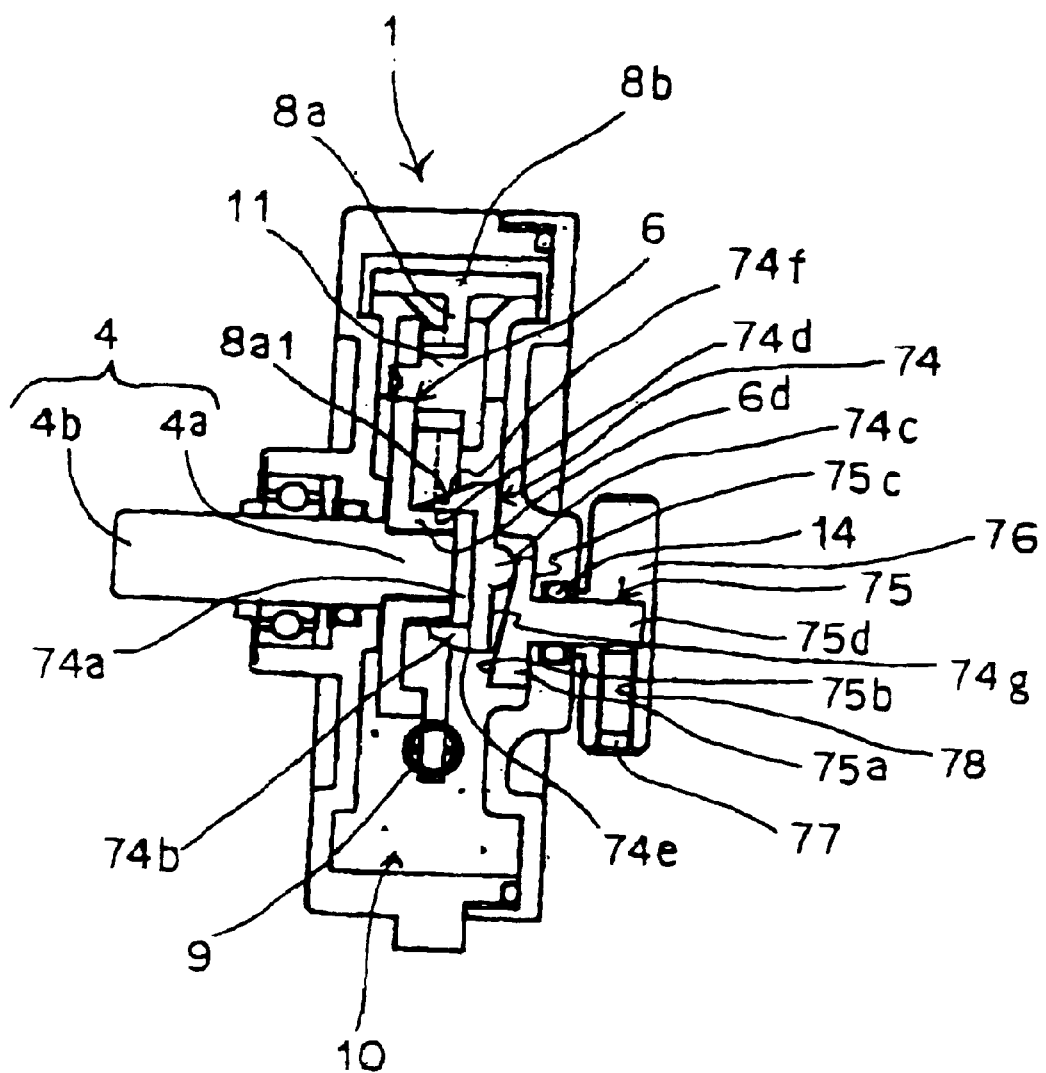
FIG. 29 is a sectional view of the rotary damper according to the 6th configuration example of the present invention in a state of generating the minimum torque.

As shown in FIG. 28 and FIG. 29, the opening 74d of the conical base 74b is an joint portion with the basement portion 6 and inserts the round projection portion 6b of the basement portion 6 inside the opening 74d, thereby mounting the cam member 74 on the basement portion 6. Note that, by engaging an engaged projection (not shown) of the basement portion 6 with the engaging groove 74e disposed in the opening 74d of the conical base 74b, the cam member 74 is non-rotatably joined with the basement portion 6.

The adjustment member 75 is attached to the housing 2 through the O-ring 14 of the bar 75d, and an adjustment knob 76 as an action portion is engaged with the other end portion of the bar 75d. The adjustment knob 76 comprises a ring-shaped main body, a screw hole 78 along the main body in the radial direction and a screw 77 screwed thereto, and by pressing the end surface of the screw 77 against the outer surface of the bar 75d of the adjustment member 75 while the screw 77 is screwed into the screw hole 78, the adjustment knob 76 is fixed to the adjustment member 75.

By the tension springs 9, 9, the end surface 8a1 of the sliding portion 8a of the slide member 8 is energized against the conical surface 74f which is the cam surface of the cam member 74. By the axial partial output of this energization force of the drive shaft 4, the cam member 74 is energized against the adjustment member 75 so that the semi-spherical projection 74c of the cam member 74 abuts against the action surface 75d of the adjustment member 75.

In order to narrow the above described central distance which is a radial distance between the outer surface 8c of the slide member 8 and the inner peripheral surface 3a of the chamber 3, the action surface 75b of the adjustment member 75 is rotated with the bar 75d as a center by turning the adjustment knob 76 opposing to the partial output of the above described energization force and the position of the region of the action surface 75b contacting the semi-spherical projection 74c of the cam member 74 is changed. At this time, while the cam member is moved to the left side in the drawing so that the radial thickness δ of the round substrate 75 in the position adjacent to the semi-spherical projection 74c increases, the outer surface 8c of the slide member 8 is moved near to the inner peripheral surface 3a of the chamber 3 and the adjustment knob 76 is stopped from turning where the desired central distance is given.

On the other hand, in order to make the above described central distance wider, by turning the adjustment knob 76 in the direction where the partial output of the above described energization force acts, the action surface 75b of the adjustment member 75 is rotated with the bar 75d as a center and the position of the action surface 75b contacting the semi-spherical projection 74c of the cam member 74 is changed. At this time, while the cam member is moved to the right side in the drawing so that the radial thickness 6 of the round substrate 75 in the position adjacent to the semi-spherical projection 74c decreases, the outer surface 8c of the slide member is isolated from the inner peripheral surface 3a of the chamber 3 and the adjustment knob 36 is stopped from turning where the desired central distance is given.

As described above, in order to obtain the central distance for giving the desired torque by the rotation of the rotary member, by continuously changing the position of the action surface 75b of the adjustment member 75 contacting the semi-spherical projection 74c of the cam member 74, the cam member 74 can be certainly moved along the drive shaft 4 by the predetermined distance.

Figure 30:
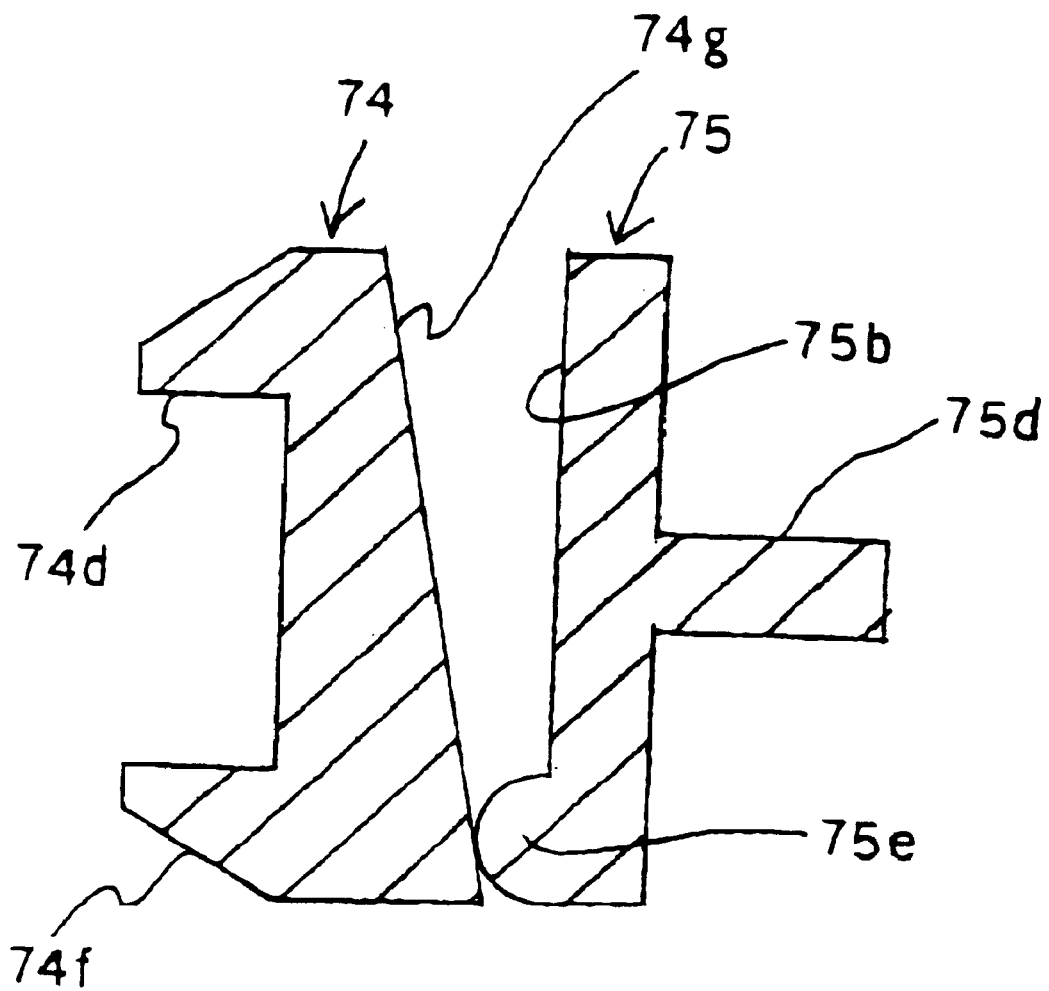
FIG. 30 is a sectional view showing a modified example of the torque adjustor used for the rotary damper according to the 6th configuration example of the present invention.

Note that, as shown in FIG. 30, as the engaging method of the cam member 74 with the adjustment member 75, in contrast to the above described example, the wall portion surface 74g of the cam member 74 is taken as an axially slant surface and the semi-spherical projection 75e may be disposed in the action surface 75b of the adjustment member 75. By the axial partial output of the energization force of the drive shaft 4 by the tension springs 9, 9, the cam member 74 is energized by the adjustment member 75 so that the wall portion surface 74g of the cam member 74 abuts against the semi-spherical projection 75e disposed in the action surface 75b of the adjustment member 75.

Figure 31:
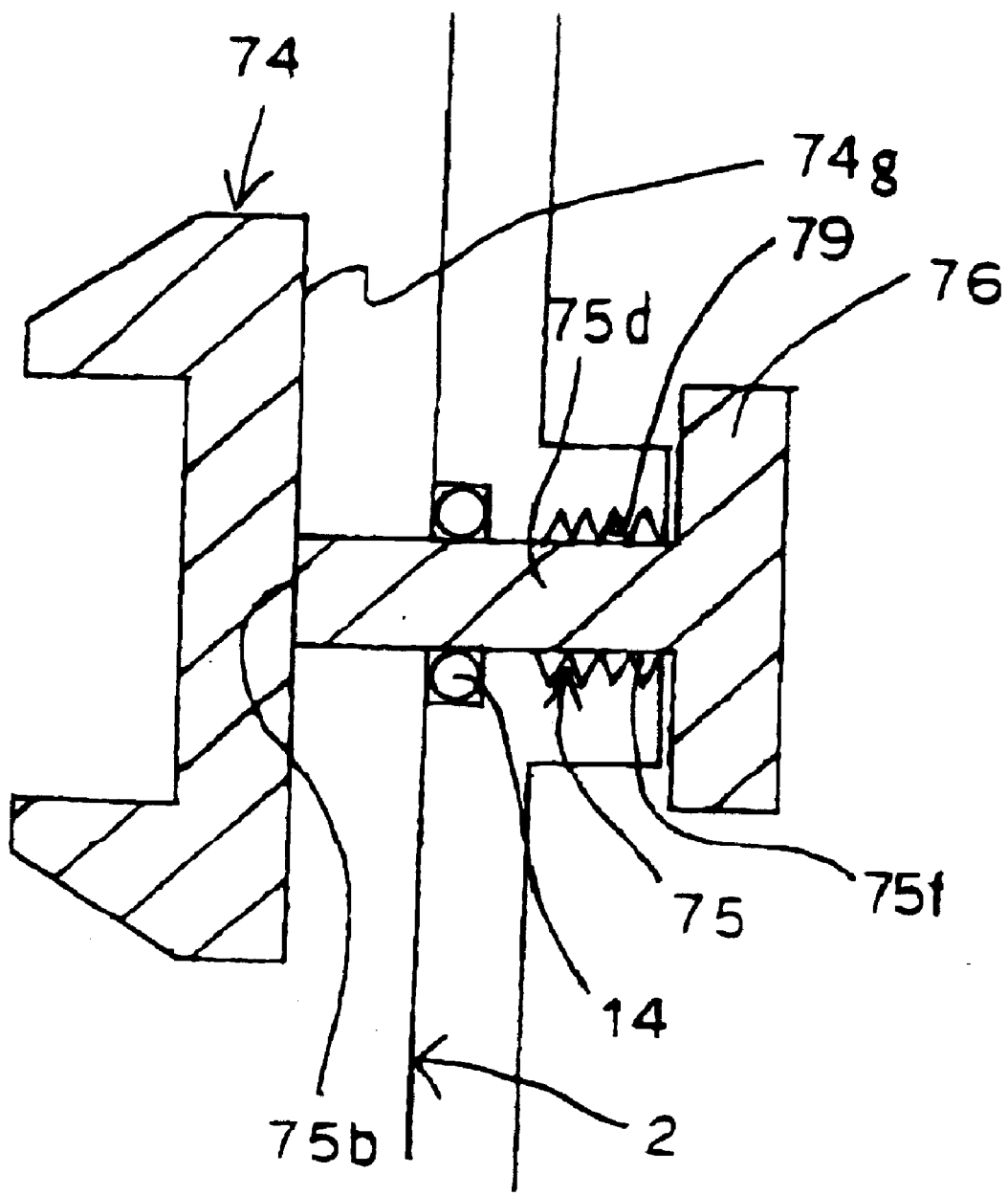
FIG. 31 is a sectional view showing the modified example of the torque adjustor used for the rotary damper according to the 6th configuration example of the present invention.

Moreover, as shown in FIG. 31, with the wall portion surface 74g of the cam member 74 made axially vertical, the end surface 75b of the bar 75d of the adjustment member 75 maybe taken as an action surface. By the axial partial output of the energization force of the drive shaft 4 by the tension springs 9, 9, the cam member 74 is energized by the adjustment member 75 so that the wall portion surface 74g of the cam member 74 abuts against the end surface 75b of the bar 75d of the adjustment member 75. In this example, a screw hole 79 disposed inside a casing 2 and a screw portion 75f disposed on the outer peripheral surface of the bar 75d are screwed together and, by the rotation of the adjustment knob 76, the bar 75d is taken in and taken out along the screw hole 79, thereby moving the cam member 74 along the drive shaft 4.

Figure 32:
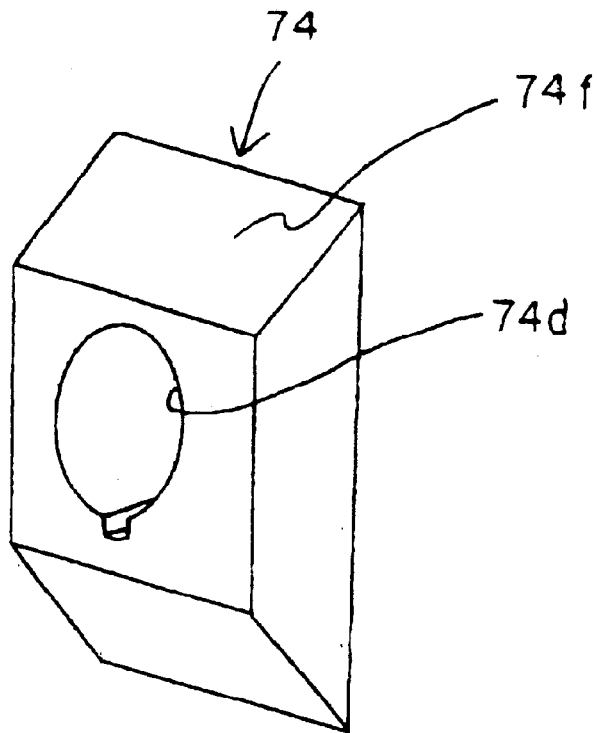
FIG. 32 is an oblique view showing a modified example of the cam member of the torque adjustor used for the rotary damper according to the 6th configuration example of the present invention.

Moreover, the base substrate 74a of the cam member 74 may have such a structure that the energization force acts on its one side so that the axial partial output of the drive shaft 4 can be obtained from the end surface 8a1 of the sliding portion 8a of the slide member 8. Accordingly, the structure is not limited to the one where the whole outer surface of one side is constituted of a conical surface 74f. For example, as shown in FIG. 32, with the whole part of the cam member 74 made square-shaped, only the cam surface contacting the end surface 8a1 of the sliding portion 8a of the slide member 8 may be taken as a slant surface 74f.

The rotary damper 1 according to the 1st invention of the present invention as described above is a bi-directional damper for generating a braking torque whichever direction the rotary member rotates. Therefore, when such a rotary damper is applied to the handing door, as described hereunder, in order not to generate the braking torque, it is necessary to fix a pinion to the drive shaft projected outside of the housing through one way clutch or the like.

Next, the rotary damper according to the 2nd invention will be described hereunder. However, only the part from which the rotary damper according to the above described 1st invention is different will be described.

Figure 18:
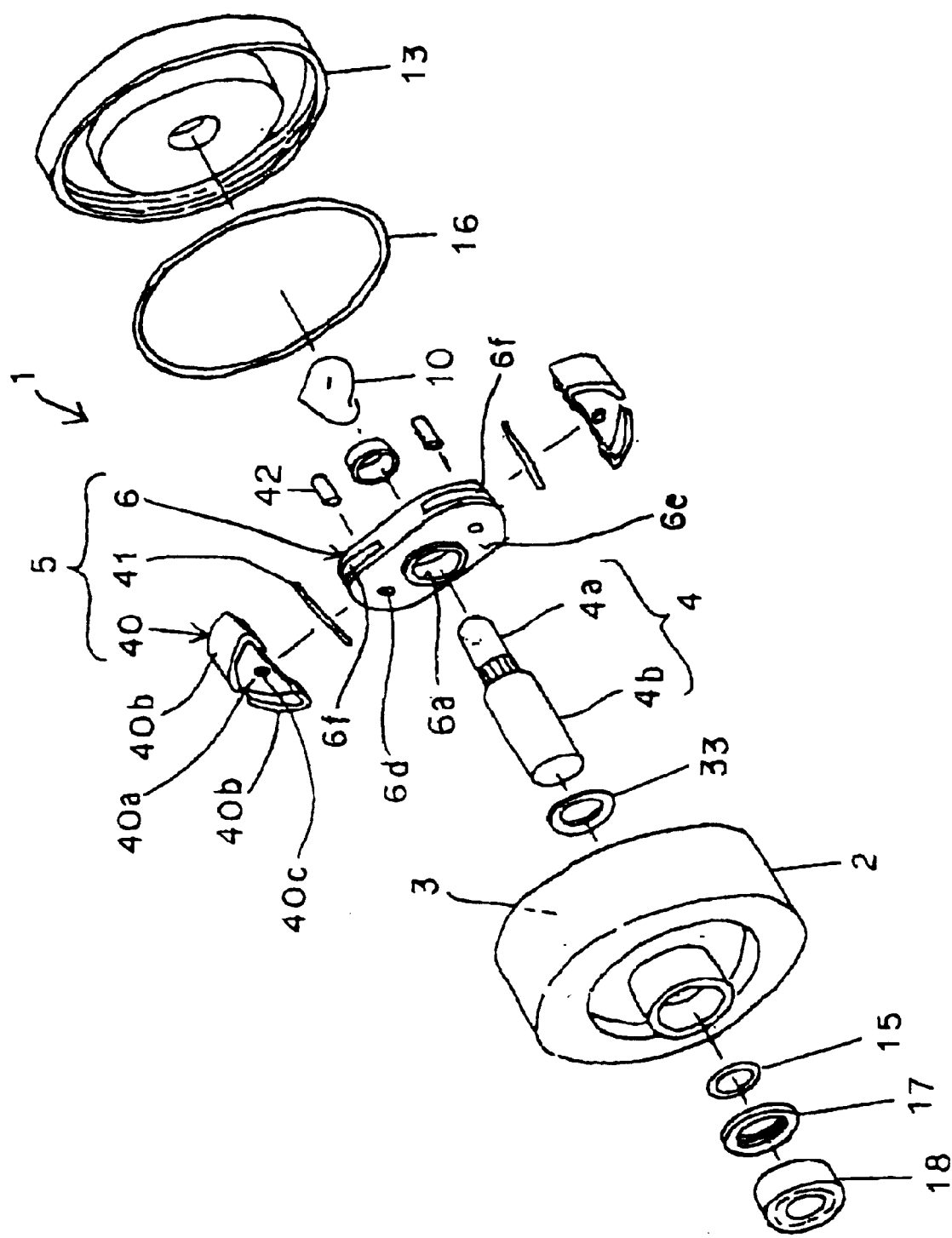
FIG. 18 is an exploded oblique view of the rotary damper according to a 7th configuration example of the present invention.
Figure 19:
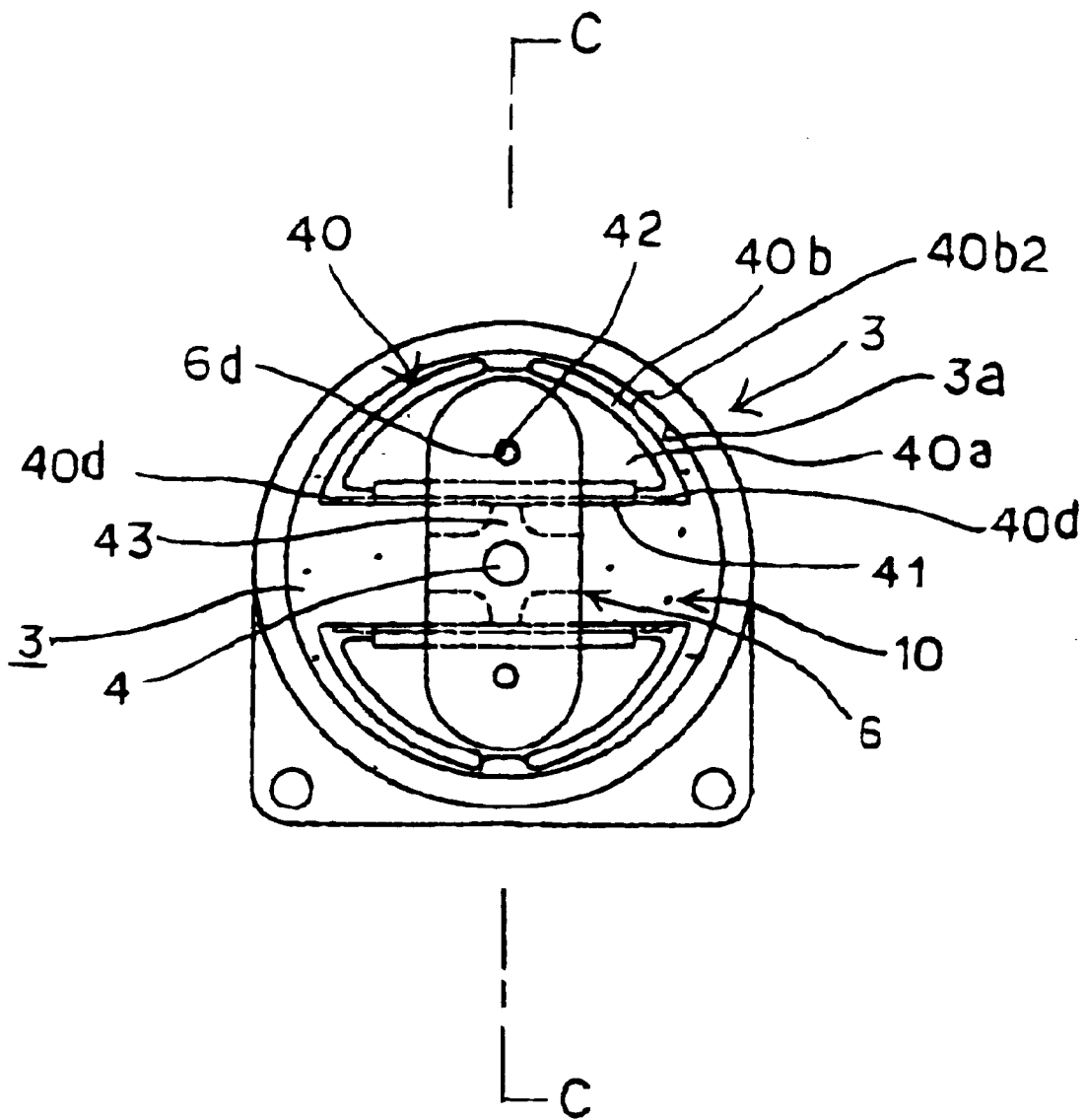
FIG. 19 is an inside explanatory drawing of the same rotary damper.
Figure 20:
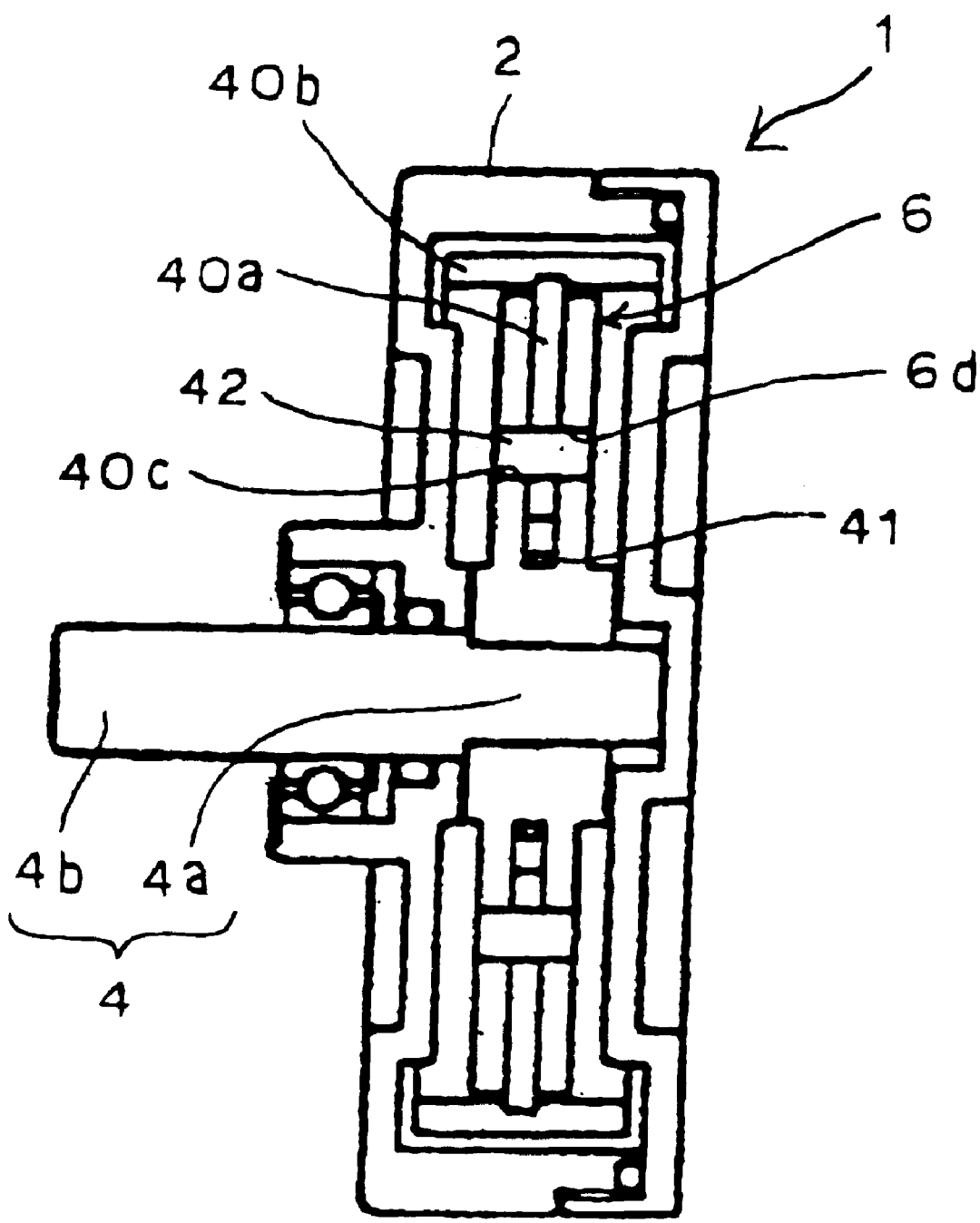
FIG. 20 is a sectional view cut along C—C line in FIG. 19.
Figure 21:
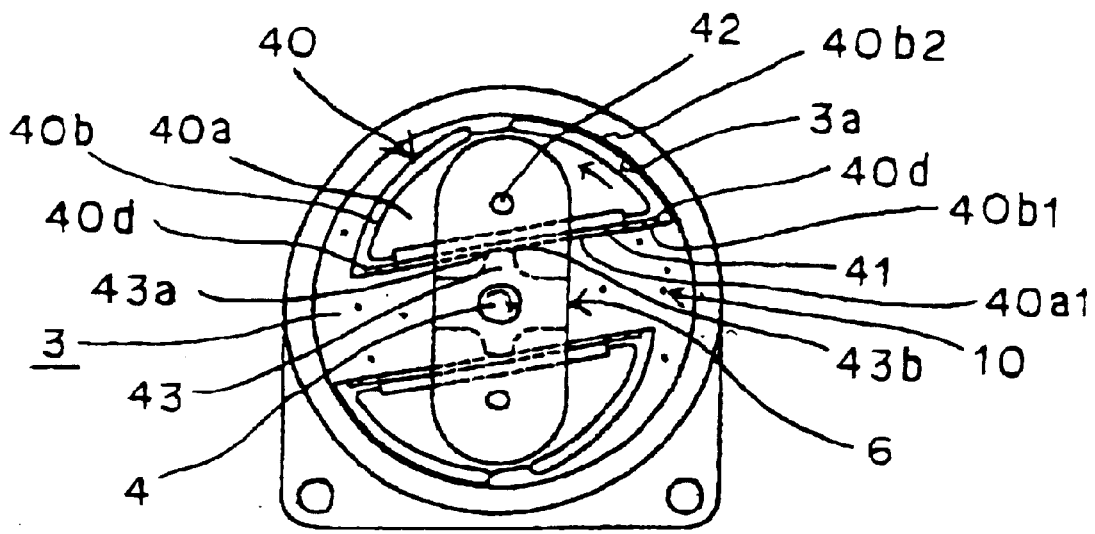
FIG. 21 is an explanatory drawing showing an oscillating state of an oscillation member by the rotation of a drive shaft.
Figure 22:
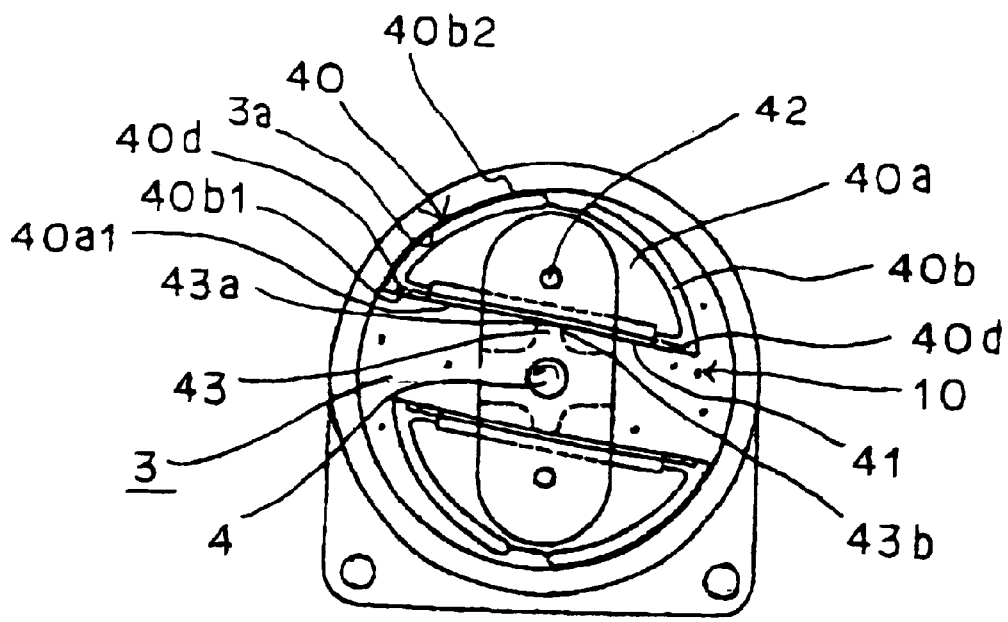
FIG. 22 is an explanatory drawing showing an oscillating state of the oscillation member by the rotation of the drive shaft in the same rotary damper.

First, the rotary damper according to the 7th configuration example will be described based on FIG. 18 to FIG. 22. FIG. 18 is an exploded oblique view of the present rotary damper, FIG. 19 is an inside explanatory drawing and FIG. 20 is a sectional view cut along C—C line of FIG. 19. FIG. 21 and FIG. 22 are explanatory drawings showing a state of the oscillation member oscillating by the rotation of the drive shaft. Note that, in each member of the rotary damper shown in FIG. 18 to FIG. 22, the same reference numerals are attached to the members similar to the rotary damper according to the 1st invention.

The rotary member 5 is constituted of the basement portion 6 of an approximately oval shape with the basement end side 4a of the drive shaft 4 inserted into an shaft hole 6a and axially supported, an oscillation member 40 attached oscillationally to the basement portion 6 and a spring means 41 interposed between the oscillation member 40 and the basement portion 6.

The oscillation member 40 is composed of a semicircular plate 40a and wall members 40b, 40b disposed at the circumference portion of the semicircular plate 40a and both ends of the base. At both ends of the base of each wall member 40b, side grooves 40d, 40d are formed, and at the approximate center of the semicircular plate 40a, a hole 40c is formed. The outer surface 40b2 of the wall member 40b in the circumference portion has a complementary shape to a part of the inner peripheral surface 3a of the chamber 3.

Across the whole of each semicircular shaped round portion of the basement portion 6, grooves 6f, 6f parallel to a surface 6e are formed, and at the approximate center of each round portion, holes 6d, 6d are formed.

The both ends of a wire spring 41 as the above described spring means are respectively inserted inside side-grooves 40d, 40d formed at the base portion of each wall member 40b. Note that as the spring means a leaf spring may be used in addition to the wire spring. Each oscillation member 40 mounted with the wire spring 41 in this way is attached to the basement portion 6 by passing a pin 42 through the hole 40c and the hole 6d while the semicircular plate 40a portion is inserted inside the groove 6f of the basement portion 6. The center portion of the wire spring 41 is pressed outward in the radial direction of the chamber 3 by the upper surface of a convex shaped support member 43 disposed in the basement portion 6. Each oscillation member 40 attached in this way oscillates like a pendulum with the pin 42 as a center by receiving the force of more than the regular amount at the base portion of each wall member 40b.

Such a rotary damper 1 is used, similar to the rotary damper according to the 1st invention, by fixing the housing 2 to the hanging door and by engaging the other end side 4b of the drive shaft 4 with a rack parallel to the guide rail of the hanging door through the pinion or the like.

When the hanging door is closed, the rotational operation of the hanging door is transmitted to the drive shaft 4 so as to drive the drive shaft 4. As shown in FIG. 21, when the drive shaft 4 rotates clockwise in the drawing, the basement portion 6 axially supported by the drive shaft 4 also rotates integrally with the drive shaft 4. At this time, the 40b1 of the base portion of the wall member 40b in the right side in the drawing of the oscillation member 40 and the 40a1 of the right side portion from the center as shown in the drawing among the base portion of the semicircular plate 40a receive the sheering resistance by the viscous fluid 10 when such a sheering resistance becomes equal to or more than the resistance of the wire spring 41, a supporting point of the wire spring 41 moves from a state of being supported by both ends 43a, 43b on the upper surface of the support member 43 as a supporting point to a state of being supported by one end 43a on the upper surface of the support member 43 and as a result the oscillation member 40 oscillates counterclockwise with the pin 42 as a center.

Although such a sheering resistance increases accompanied by the rotational speed of the drive shaft 4, when the sheering resistance is smaller than the resistance set in advance of the wire spring 41, the oscillation member 40 does not oscillate. When the rotation of the drive shaft 4 becomes equal to or more than the regular rotational speed and, followed by which, the sheering resistance by the viscous fluid 10 becomes equal to or more than the resistance of the wire spring 41, the oscillation member 40 begins to oscillate with the pin 42 as a center.

FIG. 21 shows a state where the sheering resistance becomes equal to or more than the above described set value. The oscillation member 40 oscillates counterclockwise in the drawing with the pin 42 as a center, and the outer surface 40b2 of the circumference portion of the wall member 40b approaches the inner peripheral surface 3a of the chamber 3 to a degree of not abutting against it. As a result, the clearance between the outer surface 40b2 of the circumference portion of the wall member 40b and the inner peripheral surface 3a of the chamber 3 is narrowed and the sheering resistance of the viscous fluid 10 existing in this clearance is increased so that a high rotational torque is generated and a braking force acts on the movement of the hanging door or the like.

As the rotational speed of the drive shaft 4 is reduced by such a high rotational torque, the sheering resistance by the viscous fluid 10 is also reduced when the sheering resistance becomes equal to or less than the resistance of the wire spring 41, the wire spring 41 by virtue of its restoring force moves from a state of being supported by one end 43a on the upper surface of the support member 43 as a supporting point to a state of being supported by both ends 43a, 43b on the upper surface of the support member 43 as a supporting point and as a result the oscillation member 40 oscillates clockwise in the drawing with the pin 42 as a center and returns to the initial position.

When the oscillation member 40 returns to the initial position in this way, the clearance between the outer surface 40b2 of the circumference portion of the wall member 40b and the inner peripheral surface 3a of the chamber 3 returns to the initial state and becomes wide so that the rotational torque is reduced and the braking force acting on the movement of the hanging door or the like is also reduced.

Note that, as shown in FIG. 22, when the drive shaft 4 rotates counterclockwise in contrast to the case as shown in FIG. 21, the oscillation member 40 oscillates clockwise in the drawing with the pin 42 as a center and the outer surface 40b2 of the circumference portion of the wall member 40b approaches the inner peripheral surface 3a of the chamber 3 to a degree of not abutting against it. After that when the shearing resistance is reduced, by the restoring force of the wire spring 41, the oscillation member 40 oscillates counterclockwise in the drawing with the pin 42 as a center and returns to the initial position.

As described above, in the rotary damper according to the 7th configuration example, when the door closing operation of the hanging door or the like which is installed with the damper temporarily accelerates the speed, the shearing resistance by the viscous fluid increases so as to generate a high rotational torque so that the braking force immediately acts on the movement of the hanging door or the like and sufficiently absorbs the abrupt operation.

Figure 23:
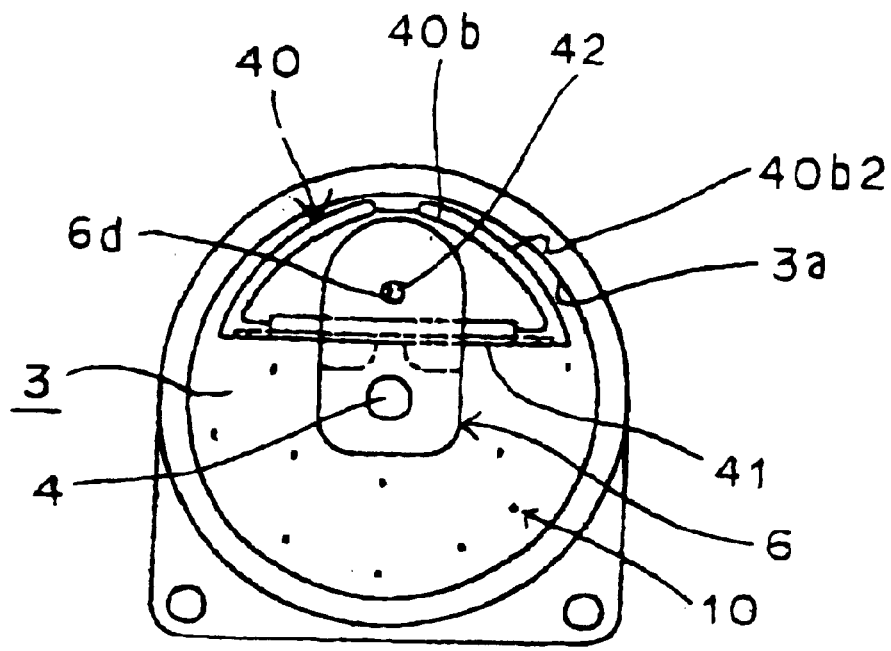
FIG. 23 is an inside explanatory drawing of the rotary damper according to an 8th configuration example of the present invention.

Next, the rotary damper according to the 8th configuration example, which is a modified example of the 7TH configuration example, will be described based on FIG. 23. The rotary damper of this configuration example has a configuration where the basement portion 6 is disposed so as to be extended radially toward one side only of the chamber 3 from the axial support portion by the drive shaft 4 and, at the outer end of the basement portion 6, the oscillation member 40 is attached. That is, a single oscillation member is used.

In contrast to the 7th configuration example, when the oscillation member 40 oscillates, because the area of the outer surface 40b2 of the wall member 40b in the vicinity of the inner surface 3a of the chamber 3 is halved, this configuration is preferably used in the case where not so high torque is required.

Figure 24:
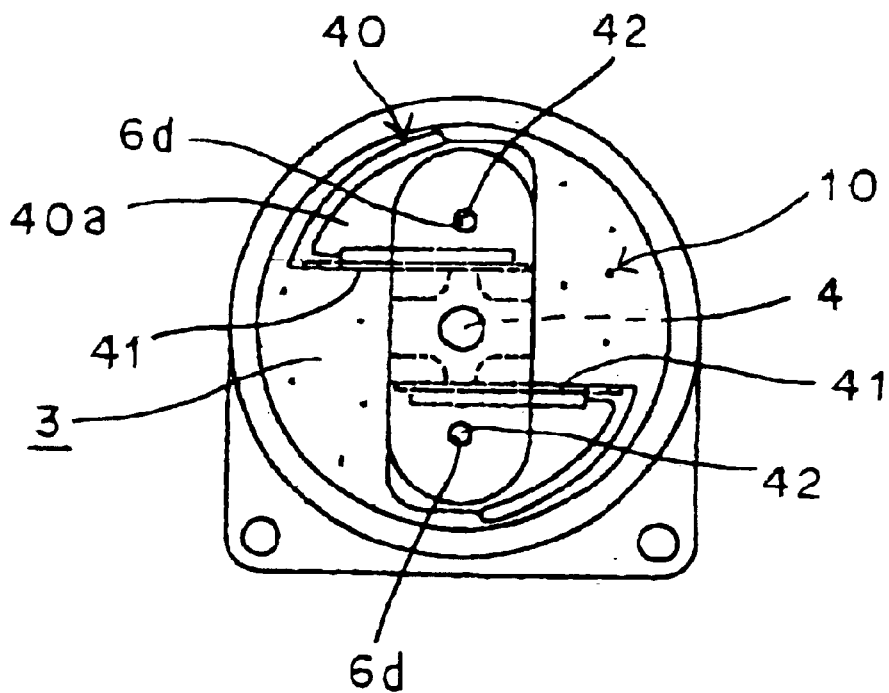
FIG. 24 is an exploded oblique view of the rotary damper according to a 9th configuration example of the present invention.

Moreover, the rotary damper according to the 9TH configuration example, which is a modified example of the 7TH configuration example, will be described based on FIG. 24. While each oscillation member 40 used in the 7th configuration example is bi-symmetrical against a straight line which passes through the axial support portion of the-pin 42, each oscillation member 40 of the present configuration example is composed of the portion which exists only at one side and each oscillation member 40 is disposed in the position where it is symmetrical against the drive shaft 4.

This rotary damper can be used as one way rotary damper because, when the drive shaft 4 rotates counterclockwise in the drawing, a high rotational torque is generated so that the braking force acts on the closing operation of the hanging door or the like, and when the drive shaft 4 rotates clockwise in the drawing, the high rotational torque can not be obtained.

Figure 10:
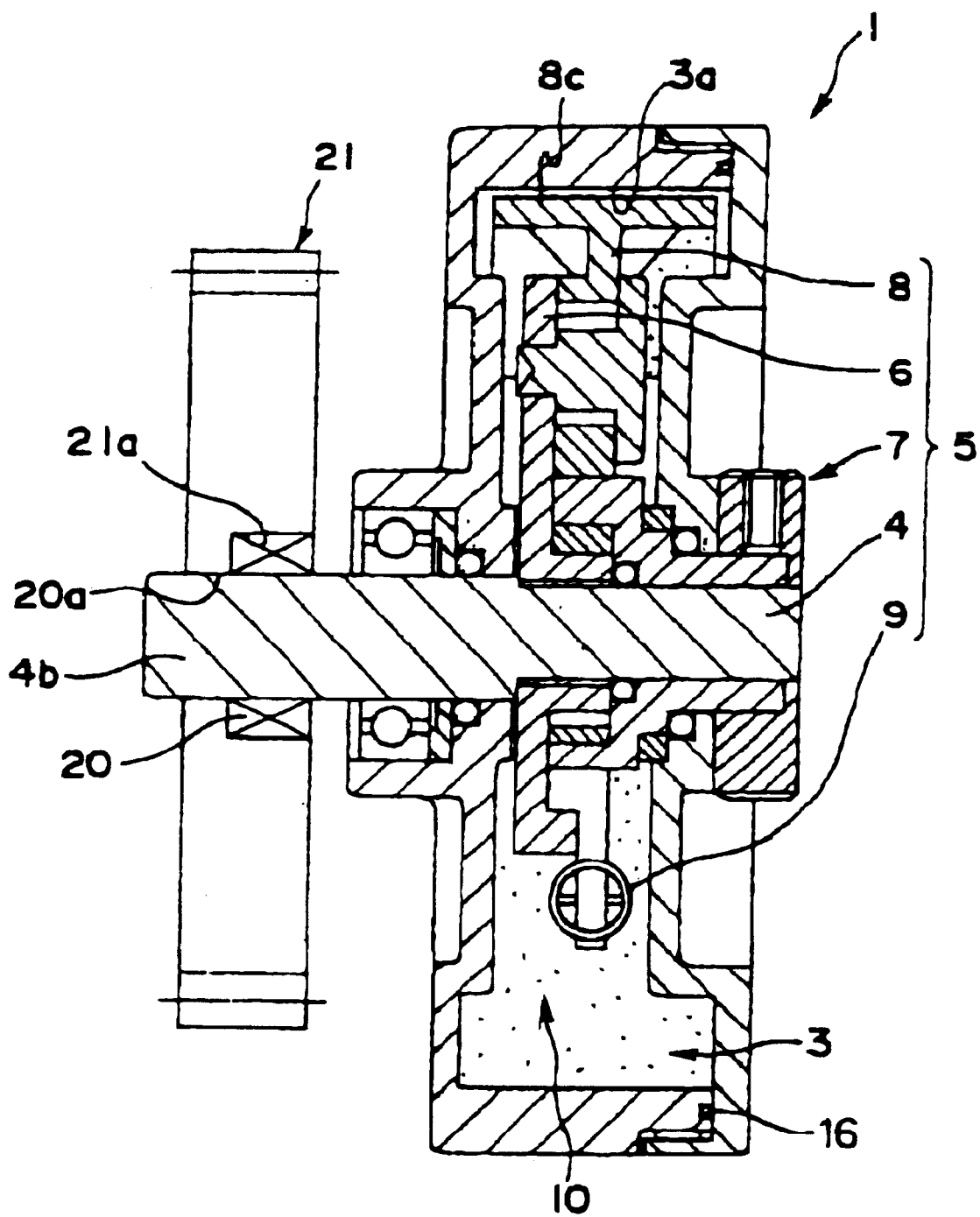
FIG. 10 is a sectional view of the rotary damper according to the 1st configuration example used for use of a hanging door braking.

Next, one embodiment of a braking device for use of the hanging door which slidably opens and closes according to the 3rd invention of the present invention will be described based on the drawings attached hereto. Therefore, it can be used as one directional rotary damper. Such a device for use of the hanging door takes the rotary damper according to the above described 1st or the 2nd configuration as a main component and is used by being mounted on the hanging door which self-closes by sliding by its dead weight. FIG. 10 is a sectional view of the rotary damper for braking use of the hanging door, FIG. 11 a front view showing an example where such a rotary damper is applied to the hanging door and FIG. 12 a side view thereof.

FIG. 10 shows an example where the rotary damper of the 1st configuration example according to the present invention as shown in FIG. 1 to FIG. 4 is applied to the braking device for use of the hanging door which self-closes while sliding. Here, the end portion of the other end side 4b of the drive shaft 4 projected outside of the housing 2 is axially supported by an shaft hole 20a of an one way clutch 20 and the one way clutch 20 is further axially supported by an shaft hole 21a of a pinion 21. The one way clutch 20 has the function of transmitting the rotational operation of the pinion 21 to the rotary shaft 4 when the pinion rotates one way and, when the pinion rotates the other way, preventing the rotational operation of the pinion 21 from being transmitted to the rotary shaft 4.

Figure 11:
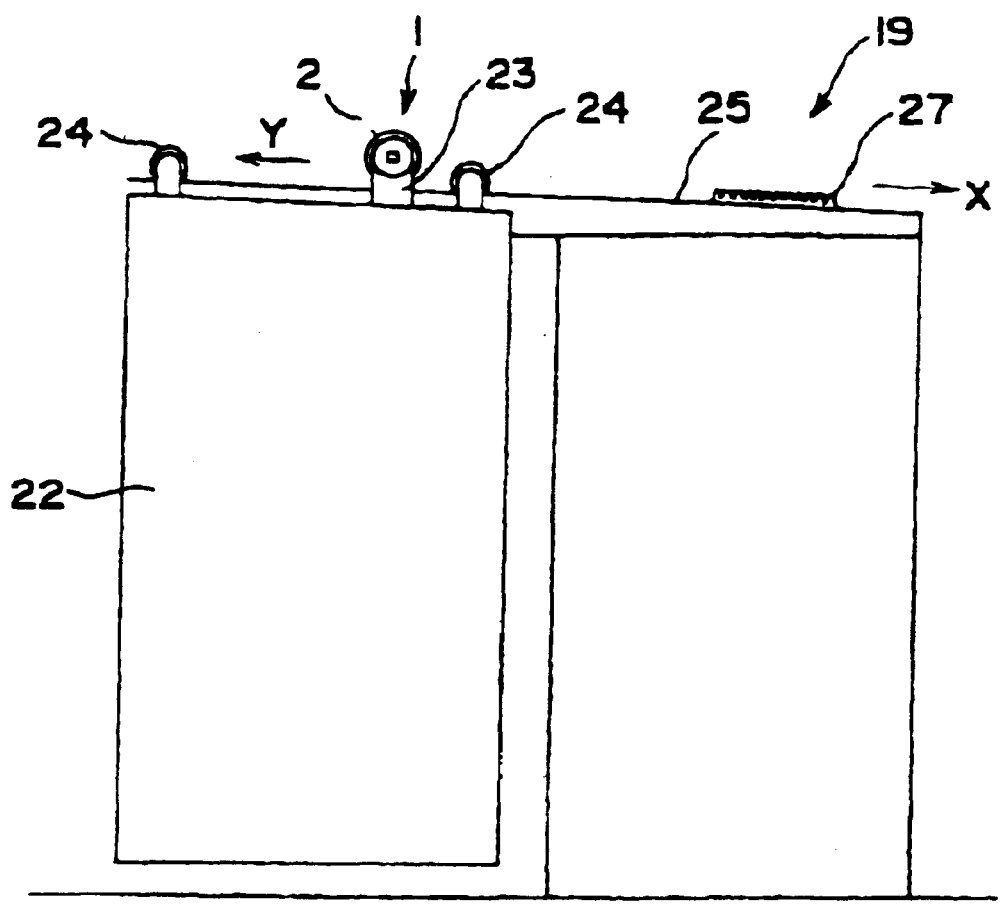
FIG. 11 is an elevation view showing the example of a hanging door braking device according to the present invention applied to the door opening and closing.
Figure 12:
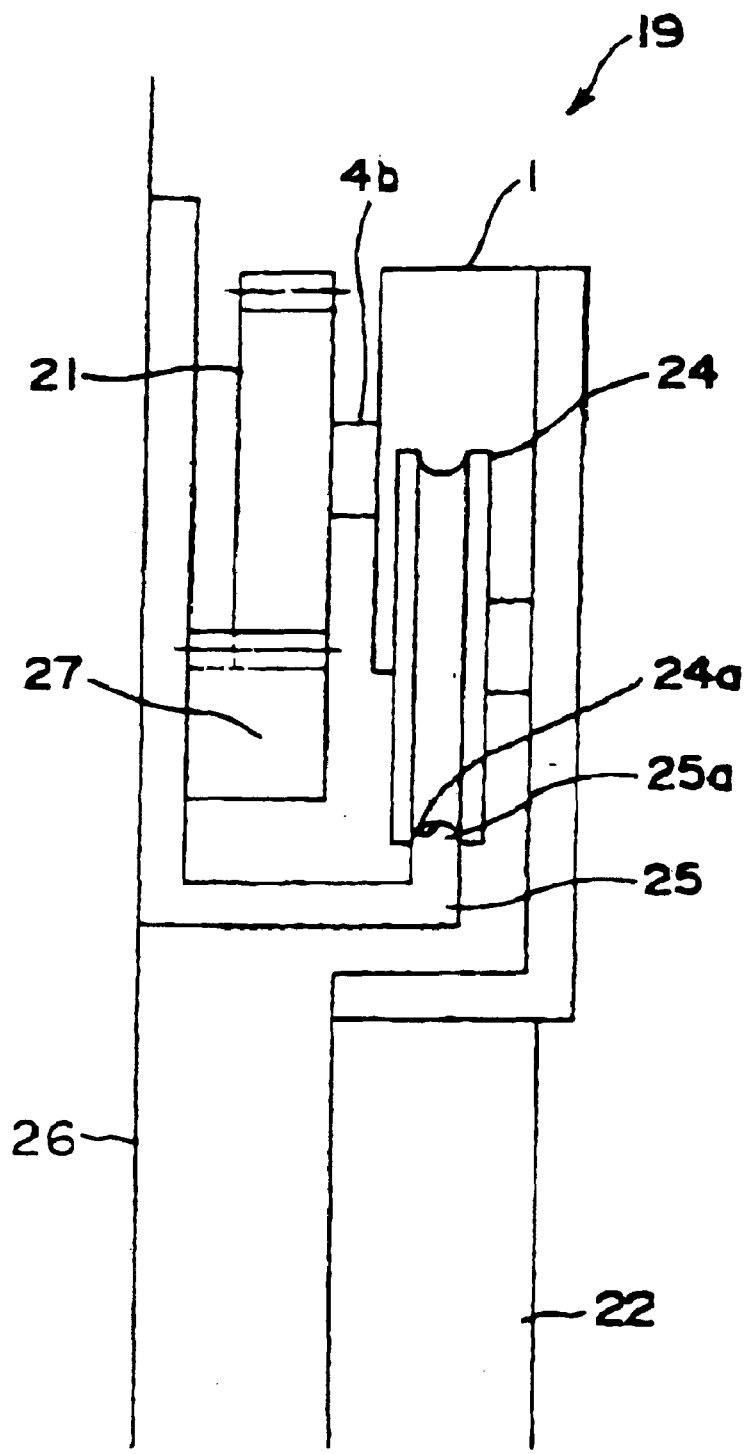
FIG. 12 is a side view showing the example of the hanging door braking device according to the present invention applied to the door opening and closing.

As shown in FIG. 11 and FIG. 12, a bracket 23 is attached to any voluntary position on the upper part of the hanging door 22 which self-closes while sliding by the dead weight, and by mounting the housing 2 of the above described rotary damper 1 on this bracket 23, the damper is fixed there.

In the vicinity of both ends of the upper part of the hanging door 22, traveling wheels 24 provided with circumferential concave portions 24a are respectively attached. Moreover, along the traveling portion of the hanging door 22, a guide rail 25 with its upper part being a convex column 25a is stretched. By allowing a concave column 24a of the traveling wheel 24 to rotate on the convex column 25a of the guide rail 25, the traveling wheel 24 travels on the guide rail 25. Note that the guide rail 25 slants downward along the closing side of the hanging door 22 so that the hanging door 22 can self-close by its dead weight.

Between the guide rail 25 and the wall 26 where the rail is attached, a rack 27 engaged with the pinion 21 is disposed on a line approximately parallel to the vicinity of the end portion which slants downward the guide rail 25.

Next, the action or the like of the braking device 19 for use of the hanging door constituted in such a way will be described.

FIG. 11 shows a state of the hanging door 22 being opened. In this state, when the hanging door 22 is pushed in the slanting direction (X) where the guide rail 25 slants downward, while the concave portion 24a of the traveling wheel 24 rotates on the convex column 25a of the guide rail 25 and travels on the guide rails 25, the hanging door 22 moves toward the direction X due to the inclination of the guide rail 25 by its dead weight.

In this way, when the hanging door 22 moves and the pinion 21 begins to engage with the rack 27, the pinion 21 rotates clockwise in the drawing, while engaging with the rack 27. Because the one way clutch (not shown) attached to the drive shaft 4 operates so as to transmit the rotational operation of the pinion 21 to the rotary shaft 4 of the damper when the pinion 21 rotates in this direction, during the engaging operation of the pinion 21 with the rack 27, the rotational operation of the pinion 21 is transmitted to the rotary shaft 4 of the damper.

When the rotational operation of the pinion 21 is transmitted to the rotary shaft 4, as shown in FIG. 4, while the torque adjustor 7 is disposed at the predetermined angle against the drive shaft 4, the rotary member 5 composed of the drive shaft 4, the basement portion 6, the torque adjustor 7, a pair of slide members 8, 8 and the tension spring means 9 rotates integrally. Because the torque adjustor 7 is arranged at the predetermined angle against the drive shaft 4, a clearance having the predetermined interval radially is formed between the outer surfaces 8c, 8c of a pair of slide members 8, 8 and the inner peripheral surface 3a of the chamber 3.

Accordingly, by the rotation of the slide member 8, the sheering force acts on the viscous fluid 10 existing in the above described clearance to generate a rotational torque and, therefore, during the engaging operation of the pinion 21 with the rack 27, the torque by the rotation of the rotary member 5 can be generated as a braking force.

The braking force generated in this way acts this time on the engaging operation of the pinion 21 with the rack 27 and as a result the braking force acts on the movement of the hanging door. Accordingly, when the pinion 21 begins to engage with the rack 27, the sliding force of the hanging door is reduced in such a manner that the door can be closed slowly.

On the other hand, when the hanging door is to slide and open from a state of being closed, the guide rail 25 is moved so as to push the hanging door 22 upward in the slanting direction (Y).

When the pinion 21 engages with the rack 27 and rotates, the rotational operation of the pinion 21 is not transmitted to the drive shaft 4 of the damper by the one way clutch 20 attached to the drive shaft 4 and thus the braking force does not acts on the movement of the hanging door 22. Accordingly, only by the force alone which pushes up the hanging door 22 in the Y direction in opposition to the force acting in the X direction based on the slanting dead weight of the hanging door, the door can be moved in the Y direction.

By the way, in a state where the hanging door 22 as shown in FIG. 11 is opened, for example, when the hanging door is pushed by mistake by very large forces in the X direction, the hanging door 22 abruptly slides in the X direction and the pinion 21 engages with the rack 27. In the initial stage of such an engagement, a high load acts temporarily on the pinion 21 so that the pinion makes a high speed rotation, which is transmitted to the rotary shaft 4 of the rotary damper 1.

However, though large centrifugal forces in response to the number of revolutions of the drive shaft 4 act on each slide member 8 of the rotary damper 1, because the tensile force of the tensile spring 9 is set smaller than the centrifugal force based on such an abrupt closing operation, by opposing to the tensile force of the tension spring 9 and by the centrifugal force equal to or more than that force, each slide member 8 is separated from the torque adjustor 7. As a result, the radial clearance formed between each outer surface 8c of each slide member 8 and the inner peripheral surface 3a of the chamber 3 is temporarily made further narrower so that a very high torque can be generated and a braking force sufficient enough to absorb the temporary abrupt closing operation of the hanging door can be obtained.

Note that, in place of the rotary damper of the above described 1st configuration example, the rotary dampers as shown in the above described 2nd to 9th configuration examples may be used. These dampers too are used in such a manner that the end portion of the other end side 4b of the drive shaft 4 projected outside of the housing 2 is axially supported in the shaft hole of the clutch having the same function as the above described one way clutch and further such an one way clutch is axially supported in the shaft hole of the pinion. Even when such rotary dampers are used, the above described effect can be obtained similarly.

Figure 25:
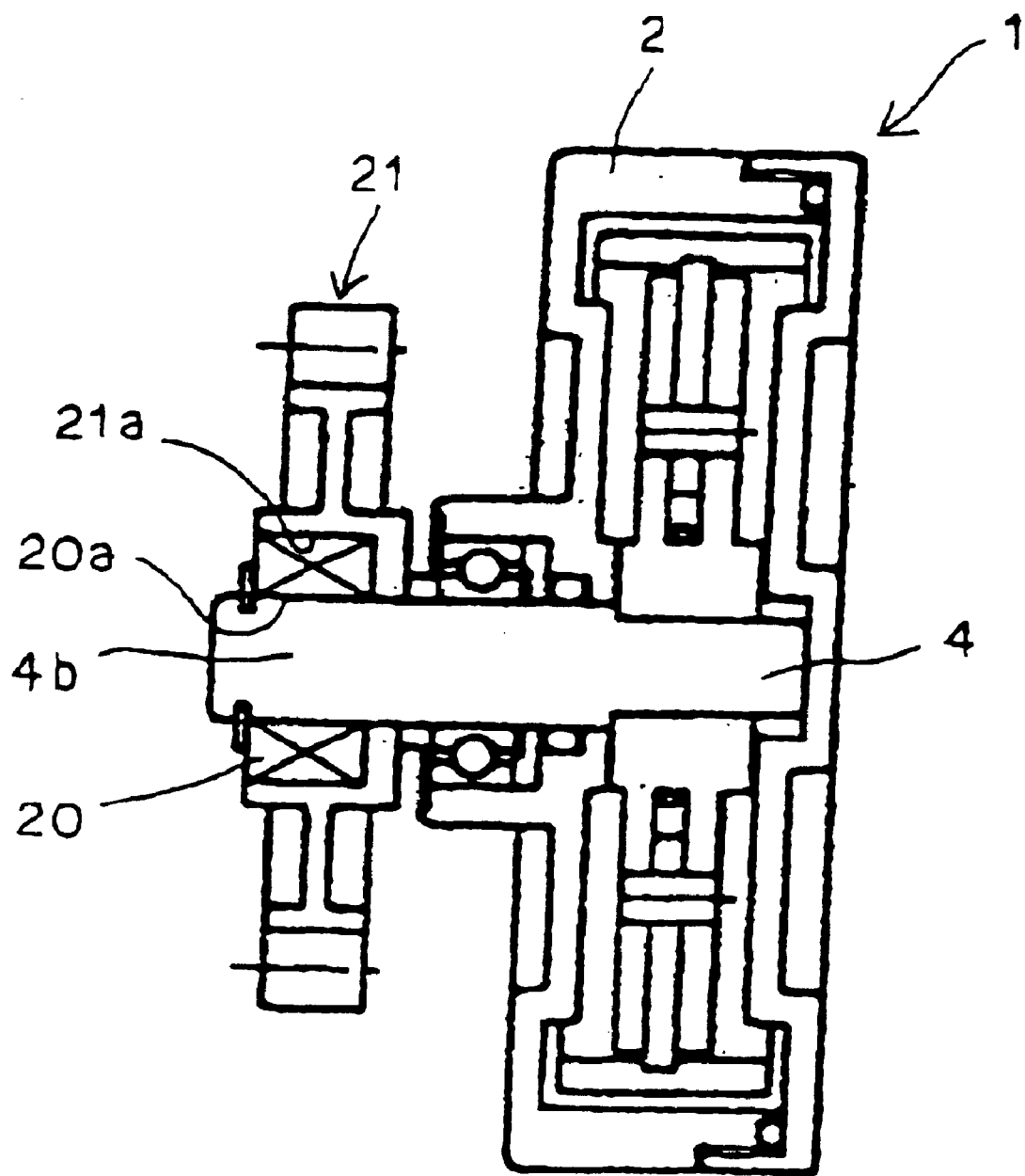
FIG. 25 is a sectional view of the rotary damper according to the 7th configuration example for use of the hanging door braking.

The example using the rotary damper of the 7th configuration example is shown in FIG. 25. This damper is used in such a manner that the end portion of the other end side 4b of the drive shaft 4 projected outside of the housing 2 of the rotary damper 1 is axially supported in the shaft hole 20a of the one way clutch 20 and the one way clutch 20 is further axially supported by the shaft hole 21a of the pinion 21.

Figure 13:
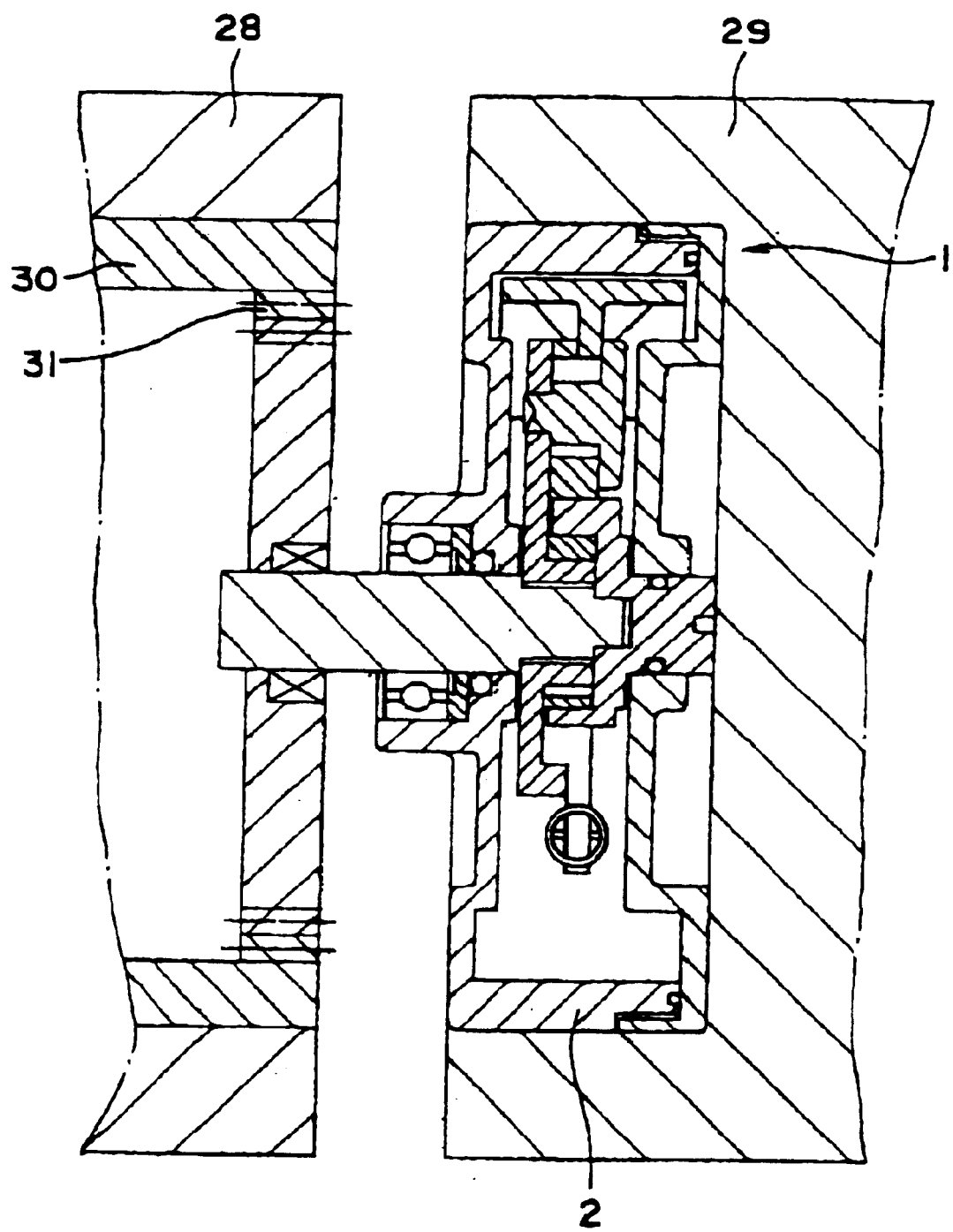
FIG. 13 is a sectional view showing the example of the braking device according to the present invention applied to a rotary lid.
Figure 14:
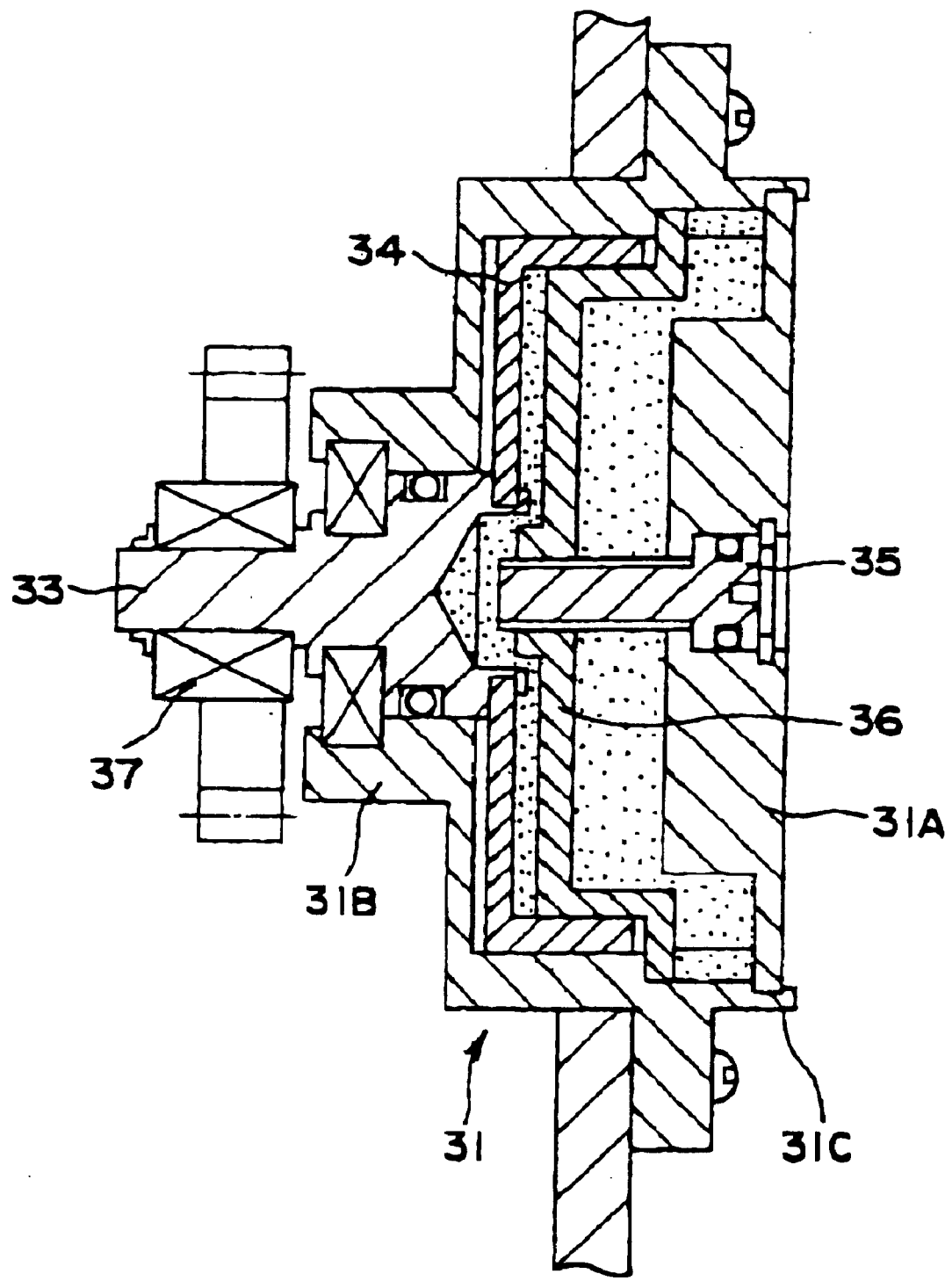
FIG. 14 is a sectional view showing the conventional door closer liquid frictional resistance type damper device.
Figure 15:
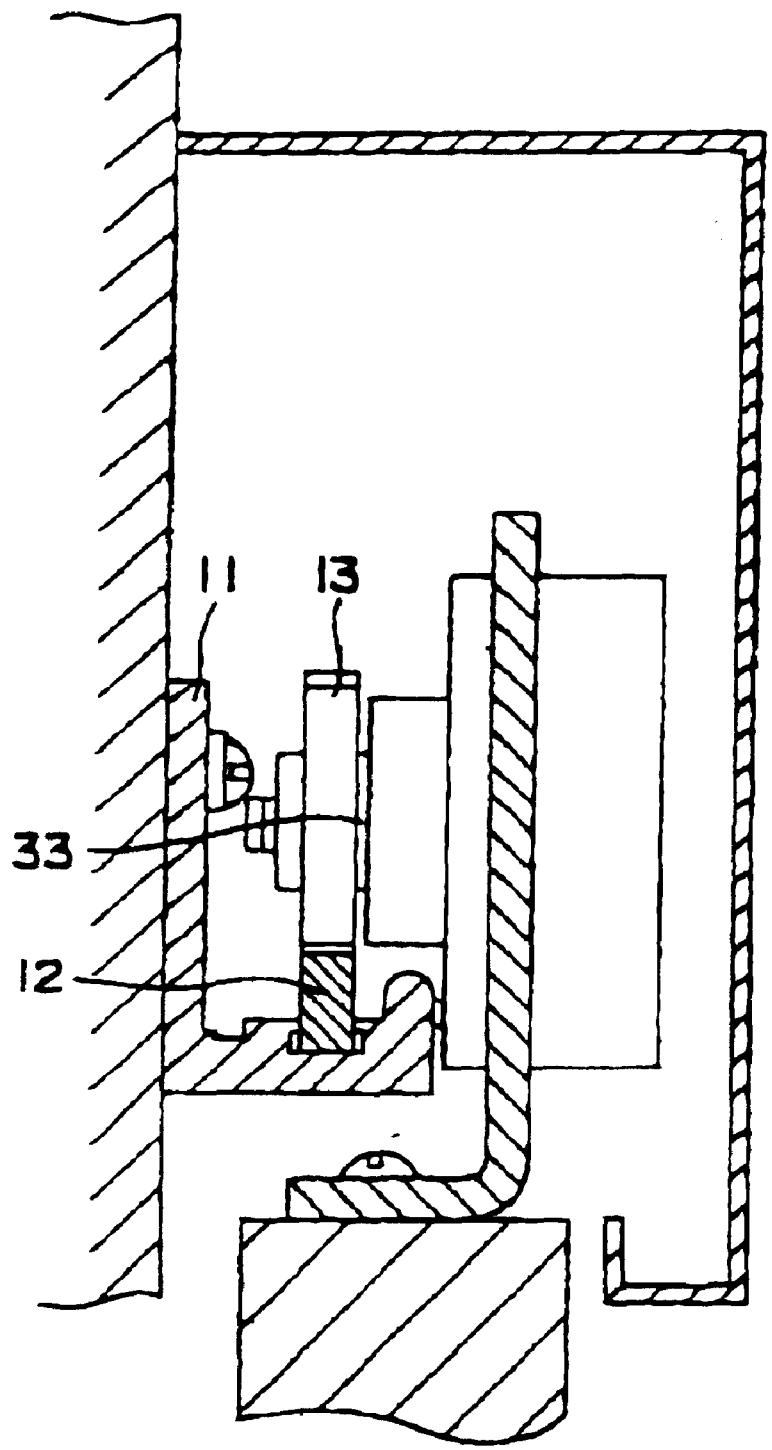
FIG. 15 is a sectional view showing a state of the conventional door closer liquid frictional resistance type rotary braking device applied to a sliding door.

Although the above described braking device was described in relation to an example where the rotary damper is mounted on the hanging door which slides in the opening and closing directions, it is not limited to such an example. For example, by using the rotary damper according to the 2nd configuration example, in FIG. 4, it is possible to adapt only the configuration where the end portion of the other end side 4b of the drive shaft 4 projected outside of the housing 2 is axially supported in the shaft hole 20a of the one way clutch 20 and further the one way clutch 20 is axially supported in the shaft hole 21a of the pinion 21, and apply this configuration to rotary doors as well as lids and doors of various equipment and devices or the like. FIG. 13 is a sectional view showing the example where this configuration was applied to rotary lids of equipment.

In this example, the housing 2 of the rotary damper 1 is embedded and fixed inside an outer frame 29 of a lid 28. Moreover, a gear 31 engaged with the above described pinion 21 is embedded and fixed inside a rotary shaft 30 of the lid.

When the lid 28 rotates in the closing direction, the rotational operation of the gear 31 is transmitted to the drive shaft 4 of the rotary damper 1 through the pinion 21. As a result, a rotational torque is generated by the rotation of the rotary member of the damper and acts as a braking force against the rotational operation of the lid 28.

On the other hand, when the lid 28 rotates in the opening direction, the transmission of the rotational operation of the gear 31 to the pinion 21 is prevented so that a rotational torque by the damper is not generated. Accordingly, the lid 28 can be easily lifted and opened.

Moreover, in the above described braking device using the hanging door which slides in the opening and closing directions, the hanging door is allowed to self-close by disposing the guide rail slanting downward in the closing side of the hanging door. However, in place of such a self-closing mechanism, for example, by adapting a traction mechanism as shown in FIG. 35, FIG. 36, the hanging door may be closed.

Figure 35:
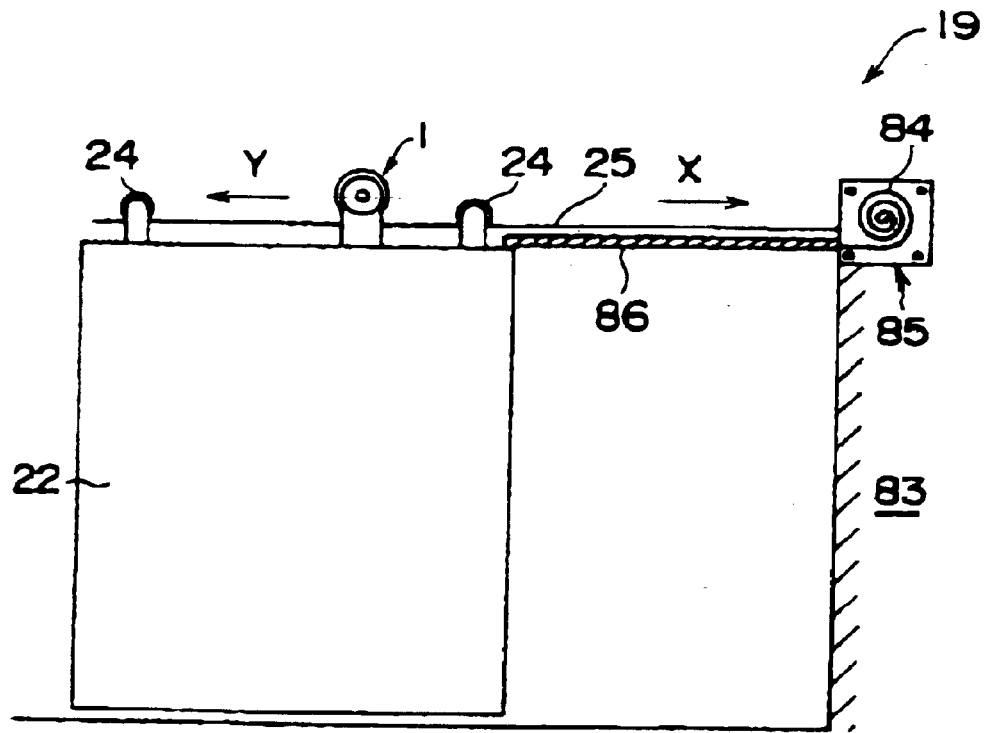
FIG. 35 is a side view showing the example of the hanging door braking device according to the present invention applied to the door opening and closing.
Figure 36:
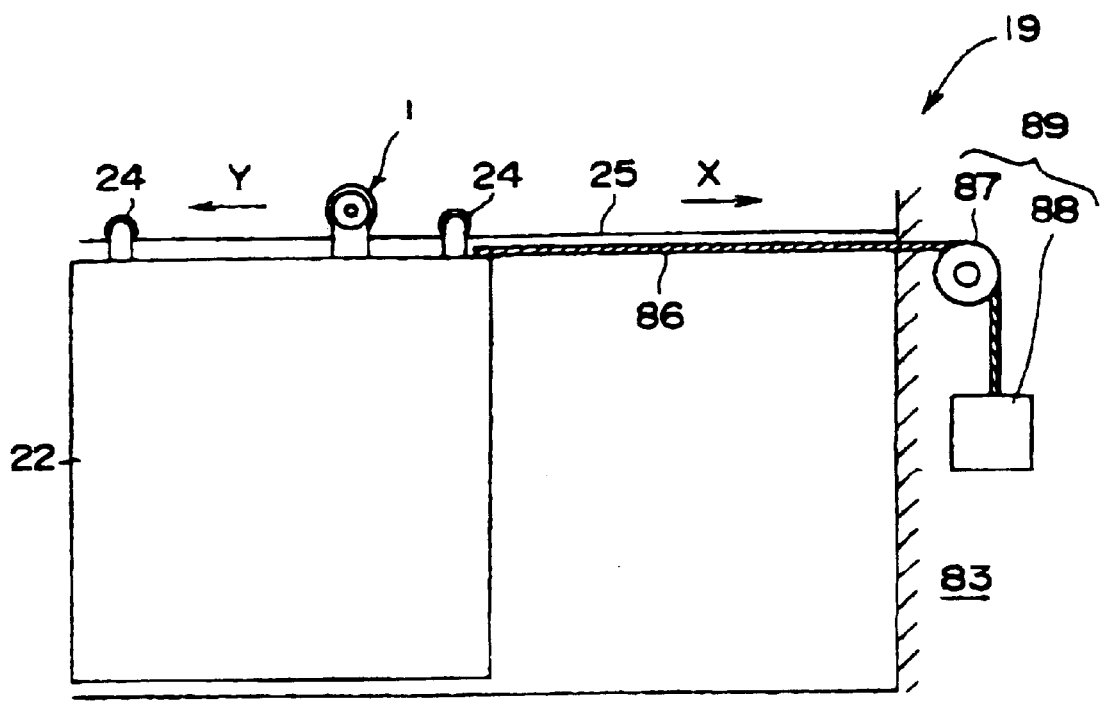
FIG. 36 is a side view showing the example of the hanging door braking device according to the present invention applied to the door opening and closing.

In the example as shown in FIG. 35, the rotary damper 1 and two pieces of traveling wheels 24, 24 as if to hold it in-between are mounted on the upper part of the sliding door 22. The guide rail 25 is stretched on the traveling portion of the hanging door 22 and the traveling wheels 24, 24 travel on it.

On a wall 83 portion where the one end side of the guide rail 25 is attached, the traction mechanism 85 where a power spring 84 is housed is mounted. A wire 86 is stretched between the end portion of the wall 83 side of the upper part of the hanging door and the power spring 84 of the traction mechanism 85.

When the hanging door 22 is pushed in the X direction, the power spring 84 is wound up and the wire 86 is also pulled inside the traction mechanism and thus the hanging door 22 moves in the X direction and is closed. The hanging door 22 is opened by pulling the hanging door in the Y direction against the tensile force of the power spring 84.

Next, the example as shown in FIG. 36 uses the traction mechanism 89 composed of a pulley 87 and a weight 88 in place of the traction mechanism 85 of FIG. 35. A wire 86 is stretched between the end portion of the wall 83 side on the upper part of the hanging door and the weight of the traction mechanism 89 through the pulley 87.

When the hanging door 22 is pushed to the X direction, the hanging door 22 moves to the X direction by the pushing force acting on the hanging door 22 and is closed. By pulling the hanging door 22 to the Y direction in opposition to the dead weight of a weight, the hanging door 22 is opened.

The braking device for use of the slide door according to the 3rd invention of the present invention is so constituted as described above that when the hanging door is closed, the hanging door can be closed by the desired braking force generated by the damper and, even when the hanging door is opened, the hanging door can be opened without receiving the braking force.

Moreover, by sliding radially the slide member of the rotary damper, the torque generated by adjusting the radial clearance formed between the outer surface of the slide member and the inner peripheral surface of the chamber is allowed to change and therefore the axial length of the main body of the damper is not particularly limited but can be shortened. The main body of the damper is arranged between the wall and the guide rail in such a manner that its axial direction is allowed to match with the direction approximately vertical to them and therefore the distance between the wall and the guide rail can be narrowed and the braking device can be made compact.

Moreover, as described above, even when a high load acts temporarily on the hanging door so as to abruptly increase the number of revolutions of the drive shaft, because the centrifugal force generated is set smaller than the tensile force of the spring means, there is the advantage that the braking force for absorbing such a temporal high load can be allowed to work.

The rotary damper according to the first invention for solving the above described problem, wherein a housing with its inside provided with a chamber, a drive shaft with its base end side housed inside the chamber, a rotary member housed inside the above described chamber axially supported by the drive shaft and a viscous fluid filled inside the above described chamber are provided and a torque is generated by the rotation of the above described rotary member, the rotary damper generating a torque by the rotation of the above described rotary member, wherein the above described rotary member is provided with a basement portion axially integrally rotatably supported by the above described drive shaft, a torque adjustor capable of making a relative movement by action of the external force of more than the regular amount while maintaining a fixed relationship with the above described drive shaft, a slide member arranged axially movably and having an outer surface complementary to a part of the inner peripheral surface of the above described chamber and a spring means for energizing the slide member against the above described torque adjustor, and wherein, by relatively moving the above described torque adjustor against the above described drive shaft, the above described slide member is allowed to slide radially along the above described basement portion in such a manner as to change a radial clearance between the outer surface of the above described slide member and the inner peripheral surface of the above described chamber, thereby changing a rotary torque of the above described rotary member.

By allowing the slide member to slide along the base portion so as to control a radial clearance formed between its outer surface and inner peripheral surface, the torque generated based on the sheering resistance of the viscous fluid existing in this clearance can be obtained. Hence, because the generated torque depends on the above described axial clearance and is changeable, the axial length of the main body of the damper can be shortened, and even when it is necessary to mount the damper on the place axially narrow in its length, the mounting of the damper is possible.

The above described torque adjustor comprises an adjustment ring integrally rotatably attached to the above described rotary member and a cam member attached to the outer periphery of the adjustment ring, wherein the outer periphery of the above described adjustment ring and the inner periphery of a center hole of the above described cam member are engaged with a concave portion formed on the one and a convex portion on the other, wherein the concave portion and convex portion are constituted in such a manner that, when the external force of more than the regular amount acts on the above described cam member, the above described cam member is allowed to swing at the predetermined angle relatively against the above described adjustment ring and the above described drive shaft.

Because the outer periphery of the adjustment ring and the inner periphery of the center hole of the cam member are engaged by the concave portion and the convex portion, the torque adjustor can be certainly arranged at the predetermined angle against the drive shaft.

By allowing the outer periphery of the cam member of the above described torque adjustor to take the shape of oval, the distance from the center of the cam member to each contact portion with a pair of the slide member and the cam member can be continuously displaced. Accordingly, because the generated torque obtainable can be continuously changed, the desired braking force corresponding to the door and the lid where the damper is mounted can be selectively obtained.

By disposing the action portion for swinging the above described torque adjustor at the predetermined angle relatively against the above described drive shaft on the radial projection portion projected outside of the housing of the above described cam member, the torque adjustor can be easily rotated till the position of the predetermined angle. With regard to such an action portion, for example, the knob or the like operable by the groove or the finger which can engage with the tip of a driver at the outside end of the cam member is used.

The above described torque adjustor comprises the cam member attached integrally rotatably to the basement portion of the above described rotary member and an adjustment member engaged with the cam member, wherein the above described cam member has a cam surface comprising a slant surface on the outer periphery, a joining portion joined axially at one side with the above described rotary member and a wall portion formed axially at the other side, wherein the above described adjustment member has an action surface engaged with the wall portion of the above described cam member axially at an inner end portion, and wherein the above described cam surface and the above described action surface are constituted in such a manner that, when the external force of more than the regular amount acts on the above described adjustment member, the position of the portion engaged with the above described wall portion of the above described cam member of the above described action surface moves axially, thereby allowing the above described cam member to move along the above described drive shaft.

In order to obtain the predetermined radial distance between the outer surface of the slide member and the inner peripheral surface of the chamber for generating the desired torque by the rotation of the rotary member, the position of the cam slant surface which contacts the action portion of the adjustment member is continuously changed so that the cam member can be arranged so as to certainly move along the drive shaft by the predetermined distance.

The adjustment member has an outer end portion projected outside the above described housing and provides an action portion for moving the above described cam member along the above described drive shaft on the above described outer end portion.

By such an action portion, the cam member can be certainly moved to the predetermined position along the drive shaft. With regard to such an action portion, for example, the knob operable by the groove or the finger which can engage with the tip of a driver is used.

The energization force of the above described spring means which is the predetermined centrifugal force acting on the above described slide member by the rotation of the rotary damper was, for example, set smaller than the centrifugal force generated when the number of revolutions of the drive shaft are increased with a high load temporarily acted on a hanging door or the like.

At such a high load action time, the centrifugal force working on the slide member is set to become equal to or higher than the energizing force of the spring means so that the slide member is separated mutually from the torque adjustor contacted by opposing to the energizing force of the spring means. Accordingly, the radial clearance formed between the outer surface of the slide member and the inner peripheral surface of the chamber can be temporarily narrowed and correspondingly a very high torque can be temporarily generated. The high torque thus obtained temporarily can absorb the temporal high load so as to allow sufficient braking force to act on the abrupt door closing operation of the hanging door or the like mounted with the damper.

Moreover, when the number of revolutions of the drive shaft returns to the initial low number of revolutions, the centrifugal force is reduced to equal to or less than the tensile force of the spring means and therefore the slide member is energized again so as to contact the torque adjustor by the tensile force of the spring means and returns to the state where the desired set torque can be generated.

Because the slide member comprises a pair of the members arranged respectively radially at both sides of the chamber through the torque adjustor, it is possible to obtain a large generating torque by increasing the total area of the slide member facing the inner peripheral surface of the chamber. The damper having such a configuration is suited to be used by attaching the damper to relatively heavy hanging door, the total area of the outer surface of the slide member which faces the inner periphery surface of the chamber can be taken large. The generated torque can be set high. The damper of such configuration is suitable for use of the hanging door or the like having a relatively heavy weight.

Because the slide member comprises a single member arranged at one side of the torque adjustor in the radial direction of the chamber, the total area of the outer surface of the slide member which faces the inner periphery surface of the chamber can be set small. Such a damper is preferably used for the hanging door or the like having a relatively light weight.

The rotary damper according to the $2^{nd}$ invention, wherein a housing with its inside provided with a chamber, a drive shaft with its basement end housed inside the chamber, a rotary member housed inside the above described chamber axially supported by the drive shaft and a viscous fluid filled inside the above described chamber are provided and a torque is generated by rotation of the above described rotary member, the rotary damper generating a torque by the rotation of the above described rotary member, wherein the above described rotary member is provided with the basement portion axially integrally rotatably supported by the above described drive shaft, an oscillation member attached oscillatorily to the basement portion and having an outer surface complementary to a part of the inner peripheral surface of the above described chamber, and a spring means interposed between the above described oscillation member and the above described base portion for allowing the oscillation member to oscillate when the force of more than the regular amount acts on the oscillation member, and wherein by oscillating the above described oscillation member against the above described basement portion by the above described force of more than the regular amount generated by the rotation of the above described drive shaft, the clearance between the outer surface of the oscillation member and the inner peripheral surface of the above described chamber is narrowed, thereby generating a torque.

When the shearing resistance of the viscous fluid by the rotation of the drive shaft becomes equal to or more than the resistance of the spring means, the rotational torque by the oscillation of the oscillation member is obtained. When the rotational speed of the drive shaft becomes high temporarily, a high torque can be obtained immediately and, thereafter, the braking force immediately acts on the abrupt door closing operation of the hanging door or the like mounted with the damper so that the temporary high load by such an abrupt operation can be easily absorbed.

Moreover, after the high torque is obtained, accompanied by the attenuation of the rotational speed of the drive shaft, the sheering resistance by the viscous fluid is also reduced. Accordingly, after the braking force acts on the abrupt door closing operation of the hanging door or the like, the initial normal door closing operation can be immediately restored.

The above described basement portion is extended to both sides radially from an axial support portion attributable to the above described drive shaft and the above described oscillation member is allowed to comprise a pair of members attached respectively to both ends of the above described basement portion. In this way, a total area of the outer surface of the oscillation member which approaches the inner peripheral surface of the chamber can be largely increased so that a high torque can be generated. Such a damper is preferably used for the hanging door or the like having a relatively heavy weight.

The above described basement portion is extended to one side radially from an axial support portion attributable to the above described drive shaft and the above described oscillation member is allowed to comprise a single member attached to an outside end of the above described basement portion. In this way, a total area of the outer surface of the oscillation member which approaches the inner surface of the chamber is made small and a generated torque can be made small. Such a damper is preferably used for the hanging door or the like having a relatively light weight.

In this way, corresponding to the weight of the hanging door or the like to be mounted with the rotary damper, a damper using a pair of, or a single oscillation member can be selected.

What is claimed is:

1. A rotary damper comprising: a housing with a chamber with an inner peripheral surface; a drive shaft with an axis and with a base end side housed inside the chamber; a rotary member housed inside said chamber axially supported by the drive shaft; and a viscous fluid filled inside said chamber, wherein said rotary member comprises:

a basement portion rotatably supported by said drive shaft;

a slide member arranged movably relative to said axis and having an outer surface complementary to a part of the inner peripheral surface of said chamber; and a torque adjustor capable of moving said slide member;

a spring energizing the slide member against said torque adjustor, said spring being not substantially projected from the outer surface of said slide member, a radial clearance having a predetermined interval formed between the outer surface of said slide member and the inner peripheral surface of said chamber, said torque adjustor being moveable along said drive shaft, said slide member sliding along said basement portion in such a manner as to change said radial clearance between the outer surface of said slide member and the inner peripheral surface of said chamber, therby changing a shearing resistance of the viscous fluid existing in said radial clearance so that rotary torque of said rotary member is changed.

2. The rotary damper according to claim 1, wherein said torque adjustor comprises:

an adjustment ring rotatably attached to said rotary member, said adjustment ring having an outer periphery; and a cam member attached to the outer periphery of the adjustment ring, said cam member having a center hole with an inner periphery and the outer periphery of said adjustment ring and the inner periphery of the center hole of said cam member being engaged with a concave portion formed on the one and a convex portion on the other; and the concave portion and convex portion being constituted in such a manner that, when an external force releases engagement of the concave portion and convex portion acting on said cam member, said cam member is allowed to swing at a predetermined angle relative to said adjustment ring and said drive shaft.

3. The rotary damper according to claim 2, wherein said cam member has an oval shaped outer peripheral.

4. The rotary damper according to claim 3, wherein said cam member has a radial projection portion projected outside of said housing and provides an action portion for swinging said torque adjustor at the predetermined angle relative to said drive shaft.

5. The rotary damper according to claim 1, wherein said torque adjustor comprises a cam member attached rotatably to the basement portion of said rotary member and an adjustment member engaged with the cam member, wherein said cam member has a cam surface comprising a slant surface on an outer periphery, a joining portion joined at one side with said rotary member and a wall portion formed at the other side, wherein said adjustment member has an action surface engaged with the wall portion of said cam member at an inner end portion, and wherein said cam surface and said action surface are constituted in such a manner that, when an external force of more than an energization force of the spring means against the torque adjustor acts on said adjustment member, the position of a portion of the action surface of said adjustment member engaged with said wall portion of said cam member of said action surface moves axially, thereby allowing said cam member to move along said drive shaft.

6. The rotary damper according to claim 5, wherein said adjustment member has an outer end portion projected outside of said housing and provides an action portion for moving said cam member along said drive shaft on said outer end portion of said adjustment member.

7. The rotary damper according to claim 1, wherein the energization force of said spring means is set smaller than a predetermined centrifugal force acting on said slide member by rotation of the rotary damper.

8. The rotary damper according to claim 1, wherein said slide member comprises a pair of the members arranged respectively radially at both sides of said chamber through said torque adjustor.

9. The rotary damper according to claim 1, wherein said slide member comprises a single member arranged at one side of said torque adjustor in the radial direction of the chamber.

10. A rotary damper comprising:

a housing having a chamber with an inner peripheral surface;

a drive shaft with a basement end housed inside the chamber;

a viscous fluid filled inside said chamber; and a rotary member housed inside said chamber axially supported by the drive shaft, said rotary member comprising:

a basement portion rotatably supported by said drive shaft;

an oscillation member attached oscillatorily to the basement portion and having an outer surface complementary to a part of the inner peripheral surface of said chamber; and spring means interposed between said oscillation member and said basement portion for allowing the oscillation member to oscillate when the force of more than the resistance force of the spring means acts on the oscillation member, and by oscillating said oscillation member against said basement portion by said resistance force generated by the rotation of said drive shaft, the clearance between the outer surface of said oscillation member and the inner peripheral surface of said chamber is narrowed, thereby increasing a shearing resistance of the viscous fluid existing in said clearance so that a high rotational torque is generated.

11. The rotary damper according to claim 10, wherein said basement portion extends to both sides radially from said drive shaft and said oscillation member comprise a pair of members attached respectively to both ends of said basement portion.

12. The rotary damper according to claim 10, wherein said basement portion extends to one side radially from said drive shaft and said oscillation member comprises a single member attached to an outside end of said basement portion.

* * * * *